United States Patent
Temblador et al.

(10) Patent No.: US 11,238,205 B1
(45) Date of Patent: Feb. 1, 2022

(54) CIRCUIT GROUPING SYSTEMS AND METHODS

(71) Applicant: Southwire Company, LLC, Carrollton, GA (US)

(72) Inventors: Richard M. Temblador, Carrollton, GA (US); Jason Clark, Destin, FL (US); Dan Enfinger, Simpsonville, SC (US); Sam Eaton, Villa Rica, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 16/536,715

(22) Filed: Aug. 9, 2019

Related U.S. Application Data

(60) Provisional application No. 62/716,648, filed on Aug. 9, 2018.

(51) Int. Cl.
*G06F 7/50* (2006.01)
*G06F 30/39* (2020.01)
*H05K 1/02* (2006.01)
*H05K 5/00* (2006.01)

(52) U.S. Cl.
CPC .......... *G06F 30/39* (2020.01); *H05K 1/0222* (2013.01); *H05K 5/0091* (2013.01)

(58) Field of Classification Search
USPC .................................................. 716/100, 110
See application file for complete search history.

(56) References Cited

U.S. PATENT DOCUMENTS

| | | | |
|---|---|---|---|
| 2012/0221986 A1* | 8/2012 | Whitford | G06F 30/13 716/100 |
| 2017/0352451 A1* | 12/2017 | Campbell | H01B 7/0009 |

\* cited by examiner

*Primary Examiner* — Brian Ngo
(74) *Attorney, Agent, or Firm* — Merchant & Gould P.C.

(57) ABSTRACT

Installation of electrical systems can require a large amount of branch circuits that can lead to a labeling degeneracy that can require a customized on-site tagging step to identify each conductor to be installed, or cause technicians to install additional circuit housing runs to circumvent the degeneracy. Circuit grouping systems and methods, and circuit installation methods, are disclosed herein that prevent such inefficiencies.

20 Claims, 9 Drawing Sheets

| Group | Conductor ID | Striped set indicator | Text string set indicator |
|---|---|---|---|
| Set 1 | 1A+ | 1A 1A 1A | ------ 1A -------- 1A --------- 1A |
| | 1A- | 1A 1A 1A | ------ 1A -------- 1A --------- 1A |
| | 1B+ | 1B 1B 1B | ------ 1B -------- 1B --------- 1B |
| | 1B- | 1B 1B 1B | ------ 1B -------- 1B --------- 1B |
| | 1C+ | 1C 1C 1C | ------ 1C -------- 1C --------- 1C |
| | 1C- | 1C 1C 1C | ------ 1C -------- 1C --------- 1C |
| Set 2 | 2A+ | 2A 2A 2A | IIIIIII 2A IIIIIIIII 2A IIIIIIIII 2A |
| | 2A- | 2A 2A 2A | IIIIIII 2A IIIIIIIII 2A IIIIIIIII 2A |
| | 2B+ | 2B 2B 2B | IIIIIII 2B IIIIIIIII 2B IIIIIIIII 2B |
| | 2B- | 2B 2B 2B | IIIIIII 2B IIIIIIIII 2B IIIIIIIII 2B |
| | 2C+ | 2C 2C 2C | IIIIIII 2C IIIIIIIII 2C IIIIIIIII 2C |
| | 2C- | 2C 2C 2C | IIIIIII 2C IIIIIIIII 2C IIIIIIIII 2C |
| Set 3 | 3A+ | 3A 3A 3A | ooooooo 3A ooooooooo 3A ooooooo |
| | 3A- | 3A 3A 3A | ooooooo 3A ooooooooo 3A ooooooo |
| | 3B+ | 3B 3B 3B | ooooooo 3B ooooooooo 3B ooooooo |
| | 3B- | 3B 3B 3B | ooooooo 3B ooooooooo 3B ooooooo |
| | 3C+ | 3C 3C 3C | ooooooo 3C ooooooooo 3C ooooooo |
| | 3C- | 3C 3C 3C | ooooooo 3C ooooooooo 3C ooooooo |
| Set 4 | 4A+ | 4A 4A 4A | <<<<<<<<< 4A >>>>>>>>>>> |
| | 4A- | 4A 4A 4A | <<<<<<<<< 4A >>>>>>>>>>> |
| | 4B+ | 4B 4B 4B | <<<<<<<<< 4B >>>>>>>>>>> |
| | 4B- | 4B 4B 4B | <<<<<<<<< 4B >>>>>>>>>>> |
| | 4C+ | 4C 4C 4C | <<<<<<<<< 4C >>>>>>>>>>> |
| | 4C- | 4C 4C 4C | <<<<<<<<< 4C >>>>>>>>>>> |

CIRCUIT GROUPING SYSTEMS AND METHODS

REFERENCE TO RELATED APPLICATION

This application claims the benefit of U.S. Provisional Patent Application No. 62/716,648, filed Aug. 9, 2018, the disclosure of which is incorporated herein by reference in its entirety.

BACKGROUND

Installation of electrical systems can comprise connecting a power source to an electrical panel through feeder cables, and installing branch circuits to distribute power from the electrical panel throughout the electrical system. Conventionally, the grouping of branch circuits can be conducted by an electrical engineer who provides the design of the electrical system to an electrical contractor, in the form of a circuit wiring diagram with diagrammed circuits grouped according to their proximity, and/or their assigned phase. However, the electrical engineer can often be required to deviate from an ideal grouping to accommodate the specific arrangement of diagrammed circuits in the circuit wiring diagram. Similarly, in order to prevent redundancy in conductor labeling within a circuit housing run, the installation of branch circuits can often deviate from the groupings provided in a conventional circuit wiring diagram (e.g., when two phase A circuits of a three-phase circuit grouping system are present within the same diagrammed circuit group). In order to circumvent this redundancy, the electrical contractors can be required to conduct an additional on-site tagging step in order to distinguish the identically labeled conductors within a circuit housing run. This additional step can lead to additional labor costs, and less durable labeling systems that may increase the costs of maintenance. Alternatively, contractors may resort to installing the degenerately labeled conductors in a separate circuit housing run altogether, resulting in increased material and labor costs.

Tagging conductors prior to installation as a workaround requires a labor intensive and error-prone reorganization of the groupings provided by the circuit wiring diagram. Circuit tagging methods are often limited to methods that are not as durable as labeling methods that can be employed during manufacture. For example, laser marking methods can provide an indelible mark during cable manufacturing processes, but may not be applicable to labeling spooled wire at a job site. Alternatively, forgoing a tagging step altogether typically leads to the installation of additional circuit housing runs to avoid redundancy in circuit labeling within any single circuit housing run, resulting in significant material waste.

Provided herein are conductor sets, circuit grouping systems, coded circuit wiring diagrams, and branch circuit installation methods that address the inefficiencies inherent to conventional conductor sets and systems, and installation methods that utilize conventional circuit wiring diagrams.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention is directed to conductor sets comprising a plurality of conductors, wherein each conductor of the plurality of conductors comprises a conductor identification that is unique with respect to each conductor in the conductor set. The conductor identification can comprise a first coded identifier correlated to a first characteristic of the conductor (e.g., the function of the conductor, such as a load or neutral conductor), a second coded identifier correlated to a second characteristic of the conductor (e.g. a phase of the conductor, such as phase A, B, or C), and a third identifier correlated to a third characteristic of the conductor (e.g., a set or grouping of the conductor). In certain embodiments, at least one of the first, second, and third identifiers can comprise both a chromatic indicator and a symbolic indictor, such that a technician may rely on either indicator for information regarding the respective characteristics of the conductor characteristic (e.g., the intended function, phase, or set of the conductor).

The present invention also discloses circuit grouping systems comprising a plurality of conductor sets, wherein each conductor within the circuit grouping system comprises a conductor identification that is not only unique within the conductor set, but is also unique with respect to each conductor in the circuit grouping system. In certain embodiments, the conductor identification can comprise a first coded identifier correlated to a function of the conductor, a second coded identifier correlated to a phase of the conductor, and a third coded identifier correlated to a set of the conductor. Circuit grouping systems disclosed herein can also comprise a uniquely labeled (or unlabeled) ground conductor.

The present invention is also directed to coded circuit wiring diagrams that correlates components of circuit grouping systems described herein to diagrammed circuits of the circuit wiring diagram. The coded circuit wiring diagrams disclosed herein can comprise a circuit housing scheme comprising a plurality of coded circuit identifiers that each represent a diagrammed circuit and correlate to a unique component of a circuit grouping system (e.g., a load/neutral conductor pair of a circuit grouping system). Each coded circuit identifier can comprise a circuit name that represents a diagrammed circuit of the circuit wiring diagram, a phase indicator that identifies the phase of the diagrammed circuit, and a set indicator that identifies the set of the diagrammed circuit.

Methods for coding circuit wiring diagrams are also disclosed herein. In certain embodiments, the coding methods can comprise obtaining a circuit wiring diagram comprising a plurality of diagrammed circuits, determining circuit data for the diagrammed circuits, grouping a portion of diagrammed circuits into a diagrammed circuit group, generating a circuit housing scheme, and producing a coded circuit wiring diagram comprising the circuit housing scheme. In certain embodiments, the circuit housing scheme can comprise a circuit name, a phase indicator, and a set indicator, for each diagrammed circuit in the diagrammed circuit group, and the phase indicator and set indicator can correspond to a unique component of a circuit grouping system disclosed herein. The grouping step can comprise selecting an electrical panel in the circuit wiring diagram, identifying the amount of diagrammed circuits associated with the electrical panel, and assigning the diagrammed circuits to a diagrammed circuit group. The diagrammed circuits can be assigned to a diagrammed circuit group based on the relative proximity of their endpoints, the phase of the diagrammed circuit, the amount of diagrammed circuits already present in the group, or any combination thereof. In certain embodiments, the amount of diagrammed circuits assigned to a diagrammed circuit group can exceed a target fill percentage, without exceeding the maximum circuit housing capacity.

Coding methods contemplated herein can further comprise generating an order for an amount of the component of the circuit grouping system to which any or all of the coded circuit identifiers are correlated. The amount can be generated based on circuit data derived from the circuit wiring diagram, e.g., circuit length. Additionally, coding methods can comprise displaying the coded circuit wiring diagram, the circuit housing scheme, the diagrammed circuit groups, coded circuit identifiers, material order forms, or any combination thereof.

The present invention is also directed to circuit installation methods comprising installing at least one circuit housing run, and loading the at least one circuit housing run with a plurality of conductors of a circuit grouping system disclosed herein, according to a circuit housing scheme comprising a plurality of coded circuit identifiers correlated to unique components of the circuit grouping system.

Also contemplated herein are on-demand methods for supplying conductors to a job site for installation, encompassing the manufacture and installation of conductors and circuit housings from start to finish, and beginning with a conventional electrical system design prepared by an electrical engineer. In certain embodiments, on-demand methods can reduce the inventory requirements for cable manufacturers, as material orders can be generated on-demand. On-demand production also allows cables to be laser marked with custom markings prior to packaging for a specific application. In certain embodiments, the on-demand methods disclosed herein can comprise obtaining a conventional circuit wiring diagram comprising a plurality of diagrammed circuits, generating a coded circuit wiring diagram comprising a coded circuit identifier for each of the plurality of diagrammed circuits, wherein each coded circuit identifier correlates to a component of a circuit grouping system, generating a material order comprising a calculated amount of each component of the circuit grouping system necessary to complete an installation, manufacturing the calculated amounts of each component of the circuit grouping system, and packaging the manufactured components of the circuit grouping system for delivery to the job site. Steps of these on-demand methods can be the same or different as those disclosed herein relevant to other systems and methods.

Systems and methods described herein can lead to an efficient, on-demand manufacturing method for supplying conductors to a job site for installation. Synergistic advantages from the entire process, from electrical system conception and design through manufacture and installation, can be achieved by relying on the circuit grouping systems disclosed herein as a guide and common reference throughout the process. The skilled artisan will appreciate the advantage of correlating systems and methods disclosed herein as a single, global method to assist the manufacture and installation of branch circuits from the original design is surprisingly efficient compared to conventional methods.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURES

The accompanying drawings, which are incorporated in and constitute a part of this disclosure, illustrate various embodiments of the present invention. In the drawings:

FIG. 4A shows a schematic for circuit grouping systems with set indicators comprising a colored stripe or a string of repeating symbolic characters.

FIG. 7 shows an interface for conducting the grouping step.

DETAILED DESCRIPTION

Figure 1:
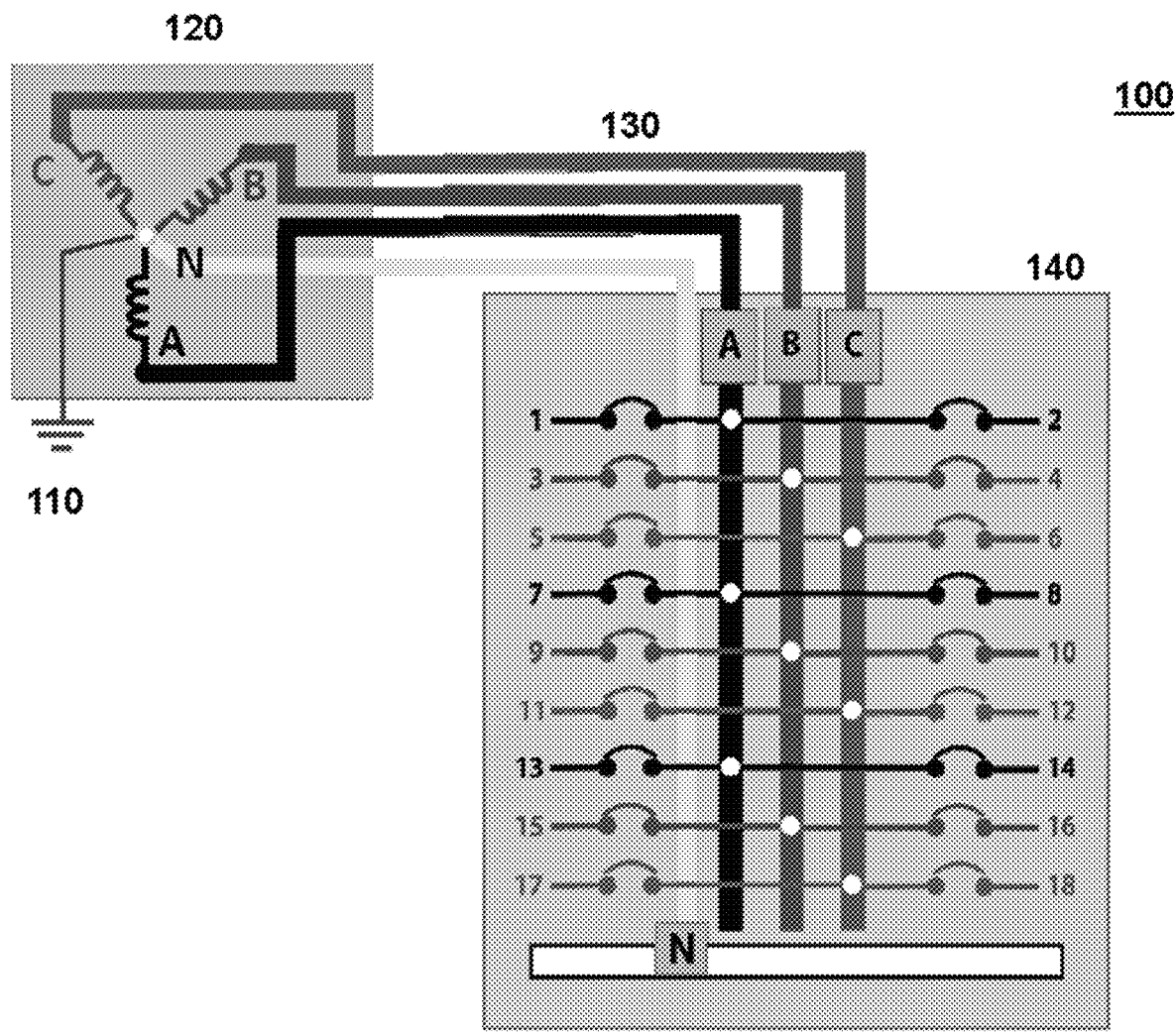
FIG. 1 shows components of a typical three-phase electrical system.

The following detailed description provides embodiments and examples of conductor sets and circuit grouping systems comprising a standardized identification system. Conductor sets and circuit grouping systems disclosed herein allow for unambiguous identification of conductors within a circuit housing run, even when grouped with multiple conductors having the same function and phase. Coded circuit wiring diagrams and methods for coding circuit wiring diagrams provide an efficient mechanism for coordinating branch circuit installations in electrical systems, using the conductor sets and circuit grouping systems described herein. Specifically, the methods and systems disclosed herein can eliminate the need for costly on-site tagging steps, reduce the amount of conductor and circuit housing materials required to complete an installation, and reduce labor and maintenance costs. Further, conductors comprising a plurality of function, phase, or set indicators are disclosed herein that can provide a diverse manner of identifying a conductor characteristic during installation, according to the preference of the installer. For instance, a phase indicator can comprise a chromatic indicator (e.g., a red background color) and a symbolic indicator (e.g., the text string "RED") to meet either preference in the field.

While embodiments of the invention may be described, modifications, adaptations, and other implementations are possible. For example, substitutions, additions, or modifications may be made to the elements illustrated in the drawings, and the methods described herein may be modified by substituting, reordering, or adding steps to the disclosed methods. Accordingly, the following detailed description does not limit the scope of the invention.

Conductor Sets

Conductor sets described herein can comprise an additional layer of information about the conductors of the conductor set, and form a fundamental unit for the circuit grouping systems and methods disclosed herein. The conductor sets can comprise a plurality of conductors, each conductor comprising a series of identifiers that distinguishes the conductor from other conductors within the conductor set. Each conductor may also comprise an identifier to distinguish the conductors from those of other conductor sets. Conductors that are suitable for the conductor sets are not limited to any particular shape, size, composition, or function, so long as they are suitable to accommodate the indicators disclosed herein, and the electrical systems to which they are installed. Generally, the conductor sets can comprise any conductor suitable for the transmission of electric power and/or electronic signals. In certain embodiments, the conductor sets can comprise conductors conventionally used for branch circuits to deliver power throughout the electrical system of a building, including, but not limited to, THHN, XHHW, THWN, PV, and USE-2 conductors, or any combination thereof.

Figure 2:
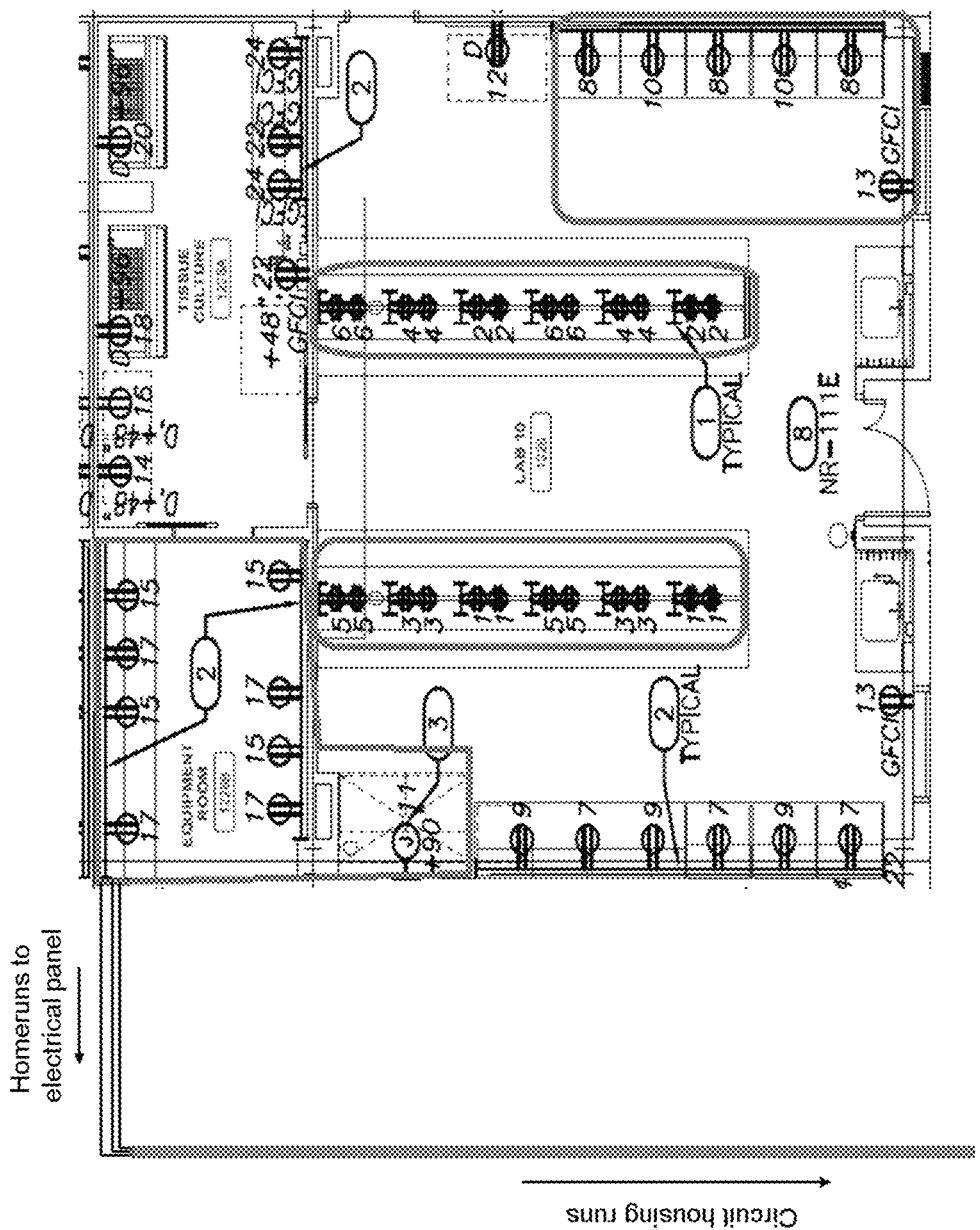
FIG. 2 shows a conventional circuit wiring diagram and groups of diagrammed circuits. Homeruns and circuit housing runs are shown for the circuit group comprising circuits 11, 15, and 17 (but omitted for other circuit groups for clarity).

Conductor sets contemplated herein can be configured for use in electrical systems comprising a three-phase power source. FIG. 1 illustrates the components of typical three-phase power system 100, where power is transmitted from source 110 to transformer 120, which transforms the power into three separate phases (e.g., A, B, and C). Feeder cables 130 then transmit the phased power to electrical panel 140, where branch circuits 1-18 are then connected to one (or more) terminals of the electrical panel. Access points (i.e., outlets, etc.) are installed along the branch circuits to allow electrical elements to connect to the power source throughout the electrical system. FIG. 2 shows a portion of a circuit wiring diagram with circuit groupings for certain diagrammed circuits. The group comprising diagrammed circuits 11, 15, and 17 shows the homeruns for each circuit and a circuit housing run encompassing each of the homeruns. Generally, three-phase power sources can be used in electrical systems where high power density is required, such as commercial and industrial buildings configured for powerful machinery and a relatively high amount and density of branch circuits. Thus, although the amount of conductors in a conductor set is not limited to any particular range, the amount of conductors can generally be suitable for use in an electrical system comprising a three-phase power source. In certain embodiments, the conductor set can comprise from 2 to 20 conductors, from 4 to 12 conductors, from 4 to 10 conductors, or from 6 to 8 conductors.

Those of ordinary skill in the art will appreciate that branch circuits of electrical systems often can comprise load conductors, neutral conductors, ground conductors, or any combination thereof. In certain embodiments, conductor sets contemplated herein can comprise conductor pairs having a load conductor and a dedicated neutral conductor associated with each load conductor. Accordingly, the conductor set can comprise from 2 to 10 conductor pairs, from 2 to 5 conductor pairs, or from 2 to 4 conductor pairs. Conductor sets contemplated herein can comprise three conductor pairs, each pair comprising a load conductor and a dedicated neutral conductor. Alternatively, the conductor sets may comprise individual load conductors and one or more shared neutral conductors to complete the branch circuits. In certain embodiments, the conductor sets can further comprise a ground conductor.

As will be understood by one of ordinary skill in the art, efficient packaging of conductor sets can facilitate branch circuit installation. Conductor sets disclosed herein can be packaged as individual conductors, or as a group of conductors. For instance, where the conductors of a set are packaged as a group, each of the conductors can be pulled from the packaging by the technician in concert, such that each conductor of the set can be pulled and installed simultaneously. Alternatively, conductors (or conductor pairs) can be individually packaged such that where only one conductor (or conductor pair) of a set is required, the required conductor can be installed independent of the remaining conductors in the set. In this manner, a circuit housing run requiring less than a complete set of conductors of a particular conductor set can be filled without material waste. Likewise, individually packaged conductors can be ordered in different amounts, where the amount of conductor required for installation of an electrical system is not equivalent for each conductor of a conductor set.

Conductors of the conductor sets contemplated herein can comprise conductor identifications comprising multiple indicators to convey information about the conductor during production, shipment, installation, etc. In this disclosure, Applicant may refer to a first coded identifier, second coded identifier, third coded identifier, etc. as a general reference to identifiers correlated to distinct conductor characteristics. For instance, a first coded identifier may comprise a function indicator correlated to a function of the conductor, a second coded identifier may comprise a phase indicator correlated to a phase of a power source, and a third coded identifier may comprise a set indicator correlated to a set of the circuit grouping system. Additionally, or alternatively, the conductors can comprise indicators correlated to electrical standards, the type of conductor, manufacturer information, inventory characteristics, commercial codes, etc.

Any of the indicators described herein can comprise a plurality of indicators, such that information regarding a single characteristic of the conductor is relayed to the technician in more than one format or style (e.g., a chromatic indicator and a symbolic indicator). For instance, in certain embodiments, a phase indicator can relay the associated phase of the conductor as a textual description of the phase and as a text color associated with a conventional color scheme. Similarly, a phase indicator can relay the associated phase of the conductor by a textual description of the phase, and a background color associated with a conventional color scheme. Imparting redundancy with multiple indicators in this manner can provide a variety of preferred schemes for communicating conductor characteristics to the technician.

Figure 3:
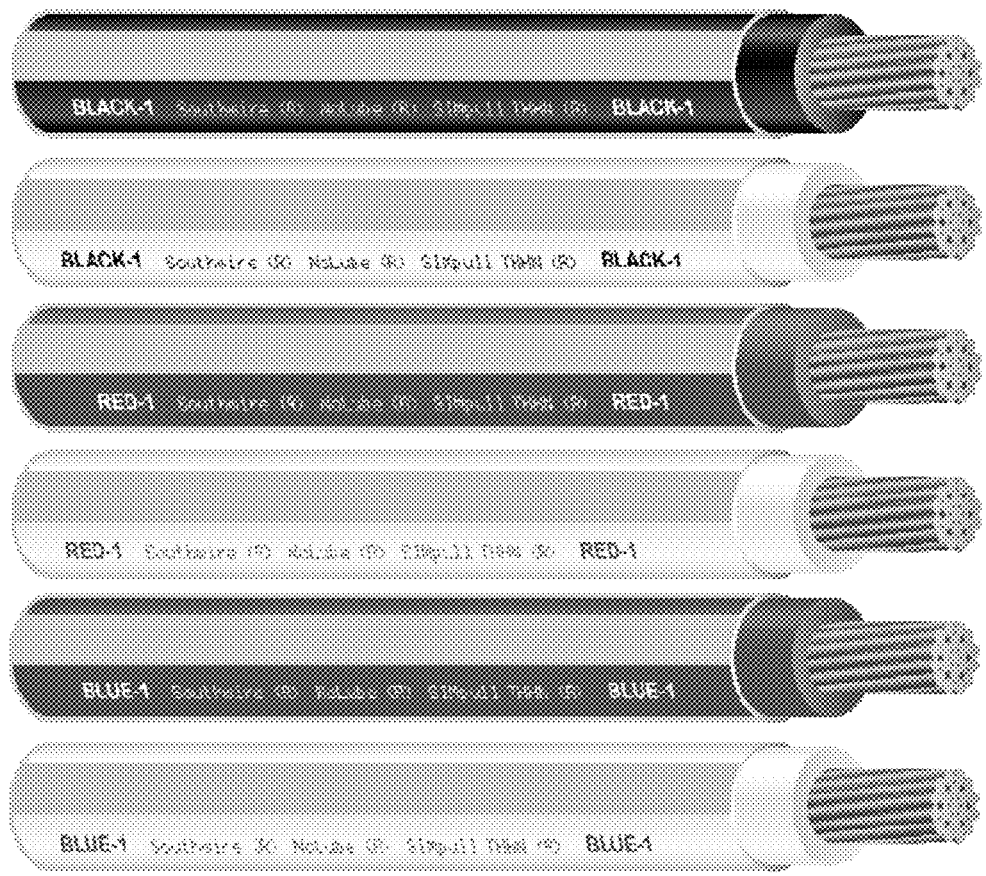
FIG. 3 shows a conductor set comprising 3 conductor pairs, each conductor comprising a unique conductor identification comprising a combination of function identifiers (background tone), phase identifiers (background color, text string, text color), and set identifiers (stripe color, text numeral) to as a conductor identification.

The indicators disclosed herein can be of any style that effectively conveys the intended information to a technician or end user. For instance, the conductor can comprise a chromatic indicator, e.g., a background color, a colored stripe, a colored design, a text color, or any combination thereof. In certain embodiments, chromatic indicators can conform to, or provide contrast against, conventional color schemes, such as a 120/208/240V color scheme or a 277/480V color scheme. For instance, a conventional 120/208/240V color scheme correlates the color black with phase A conductors, red with phase B conductors, and blue with phase C conductors. Accordingly, in certain embodiments, a phase B conductor can comprise a phase indicator comprising a red background color to correspond with the conventional 120/208/240V color scheme, and a set indicator comprising a tan stripe to provide contrast against the red background, as well as the other colors in the conventional 120/208/240V color scheme. Alternatively, or additionally, the conductors disclosed herein may comprise symbolic indicators. Symbolic indicators are not limited to any particular symbol, and can comprise alphanumeric symbols, shapes, bar codes, QR codes, and combinations thereof. Accordingly, the symbolic indicators contemplated herein can comprise a letter, a number, a text string, etc. FIG. 3 provides an example of a conductor set comprising several indicators representative of this disclosure.

As mentioned above, the function of the conductors contemplated herein is not limited to any particular function. It follows that any coded identifier correlated with the function of a conductor (e.g., a function indicator) can have similar breadth. In certain embodiments, the first coded identifier can comprise a function indicator correlated to the function of the conductor. In certain embodiments, the function of the conductor can be a load conductor and a neutral conductor. Further, the function indicator can comprise a plurality of indicators, including chromatic and symbolic indicators. In particular embodiments, the function indicator can comprise a background tone. For instance, the function indicator for load conductors can comprise a dark background tone (e.g. black, red, blue, brown, orange, yellow) and the function indicator for neutral conductors can comprise a light background color (e.g., light grey, white). FIG. 3 provides a conductor set where the function indicator for each load conductor comprises a dark background tone consistent with the conventional 120/208/240V color scheme, and the function indicator for each neutral conductor comprises a light background tone.

Phase indicators are disclosed herein that allow the technician to quickly distinguish and identify a conductor as corresponding to a particular phase of a three-phase power system (e.g., phase A, phase B, or phase C). Certain embodiments can comprise symbolic phase indicators that match the intended phase of the conductor in a straightforward manner; simply, the phase indicator can comprise the letter corresponding with the phase of the conductor. Alternatively, or additionally, the phase indicator can comprise a chromatic indicator comprising a background color and/or a text color. As above, the phase indicator can correspond to a conventional color scheme. In this manner, the background color can serve both as a function indicator by providing a dark background tone to indicate a load function, the dark color being black (or red, or blue), and further serve as a phase indicator to identify a phase A (or B, or C) conductor. Alternatively, neutral conductors can comprise a function indicator comprising a light background tone, while the phase indicator comprises a text color that matches the background color of a paired load conductor. Phase indicators also can comprise a text string that recites a color, and the color can correspond to a color of a conventional color scheme. Therefore, text strings that may serve as phase indicators include, but are not limited to, "BLACK," "RED," and "BLUE," for a 120/208/240V color scheme, and alternatively, "BROWN," "ORANGE," and "YELLOW," for a 277/480V color scheme. In certain embodiments, phase indicators for neutral conductors can comprise a colored stripe that corresponds to the background color of a paired load conductor. For conductor pairs, any of the chromatic indicators can match and correspond with a characteristic of a paired conductor. For instance, a chromatic phase indicator of a load conductor can be the same color as a chromatic phase indicator of a neutral conductor, even if each phase conductor is present in a different format or style (e.g., a background color, stripe color, text color, etc.).

Similar to other indicators disclosed herein, set indicators contemplated herein are not limited to any particular kind or combination; any manner of effectively conveying the set identification to a technician can be appropriate. In certain embodiments, the set indicator can comprise a chromatic indicator and a symbolic indicator. Where the set indicator comprises a chromatic indicator, the chromatic set indicator can be a stripe color, a text color, a background color, or combinations thereof. Where the set indicator comprises a symbolic indicator, the symbolic set indicator can comprise a stripe, a series of stripes, a shape, one or more text strings (e.g., a word, letter, numeral, etc.), a pattern of characters, or combination thereof.

The set indicators contemplated herein can comprise a plurality of set indicators, in any combination. FIG. 3 presents a non-limiting example of conductors with a set indicator comprising a colored stripe and a numeral. A person of ordinary skill in the art will recognize that where the set indicator comprises a colored stripe, the color of the stripe can be any color that provides contrast against the background color of the conductor or any other conductor in the conductor set, such as a color not used in a conventional color scheme (e.g., tan, lavender, pale green, etc.). Patterns of characters suitable for the set indicators contemplated herein can comprise a single repeating character specific to each set in the circuit grouping system, or a repeating pattern of multiple characters. Set indicators can be identical for each conductor in a conductor set.

In certain embodiments, the set indicator can comprise a pattern of characters along the length of the cable that has a similar visual effect to a stripe. In certain embodiments, marking characters along the length of a cable may be more efficient than imprinting a colored stripe. Thus, certain embodiments can advantageously comprise both a numeral set indicator and a pattern of characters in an alternating arrangement along the length of the conductors to achieve the effect of a set indicator comprising a colored stripe and a numeral. Patterns of characters suitable for set indicators contemplated herein may also comprise a text color, the same or different from any other coded identifier present on the conductor. FIG. 4A provides an example of a circuit grouping system where the set indicators comprise a pattern of repeating characters that extends between instances of a numeral set indicator.

The pattern of symbolic characters is not limited to any particular character or pattern, and can comprise ASCII characters different from those employed in other set and/or phase indicators. The length and style of the pattern of characters can depend on the amount and repeating frequency of other coded identifiers along the length of the conductor. For instance, in embodiments wherein the set indicator comprises a text string with a repeating frequency of 6 inches, the set indicator may further comprise a pattern of characters extending 6 inches between each instance of the text string. A ratio of the length of the pattern of characters to the length of a text string may therefore be greater than about 1:1, greater than about 3:1, greater than about 10:1, or in a range from about 1:1 to about 3:1, from about 1:1 to about 5:1, or from about 1:1 to about 10:1.

Coded identifiers contemplated herein can comprise indicators having a repeating frequency along the length of the conductor that ensures each of the indicators is visible to the technician throughout the installation. In certain embodiments, the repeating frequency can be less than about 10 feet, less than about 5 feet, less than about 3 feet, less than about 2 feet, or less than about 1 foot. Similarly, the repeating frequency of any indicator disclosed herein can be in a range from about 3 inches to about 10 feet, from about 6 inches to about 5 feet, or from about 1 foot to about 3 feet. The repeating frequency can be constant or variable. Alternatively, the indicator can be continuous along the length of the conductor, such as with a background color or continuous longitudinal stripe.

Methods for producing the indicators disclosed herein are not limited to any particular method, and can generally include any method that leaves a visible and lasting impression on the conductor. Methods to mark the conductors during manufacturing can be generally more reliable, durable, and efficient than methods conducted on-site, such as tagging and other manual marking methods. In certain embodiments, each indicator can comprise a marking on the conductor sheathing, a colored dye dispersed throughout the sheathing, or both. Alternatively, the indicators can comprise a printed label, a colored dye, an extruded stripe, a laser marking, a contact marking, a non-contact marking, or any combination thereof.

Circuit Grouping Systems

Circuit grouping systems disclosed herein can comprise a plurality of conductor sets, such as those described above, and thus can comprise several sets of uniquely identified conductors. In certain embodiments, each conductor of a conductor set can comprise a set indicator that is both common to each conductor within the conductor set, and unique with respect to conductors in different conductor sets of the circuit grouping system. In contrast, phase indicators and function indicators can have the same form across conductors different conductor sets, yet differ with other conductors in the same conductor set of a circuit grouping system. In this manner, the function indicator, phase indicator, and set indicator for each conductor of a circuit grouping system can provide an intuitive and standardized marking scheme wherein each conductor can be easily distinguished from other conductors of the circuit grouping system and be easily correlated to its respective function, phase, and set—even where the function and phase of multiple conductors within the circuit grouping system are identical. Thus, the circuit grouping systems described herein can comprise a standardized base set of conductors to support circuit grouping and installation methods, such as those described below.

Figure 4B:
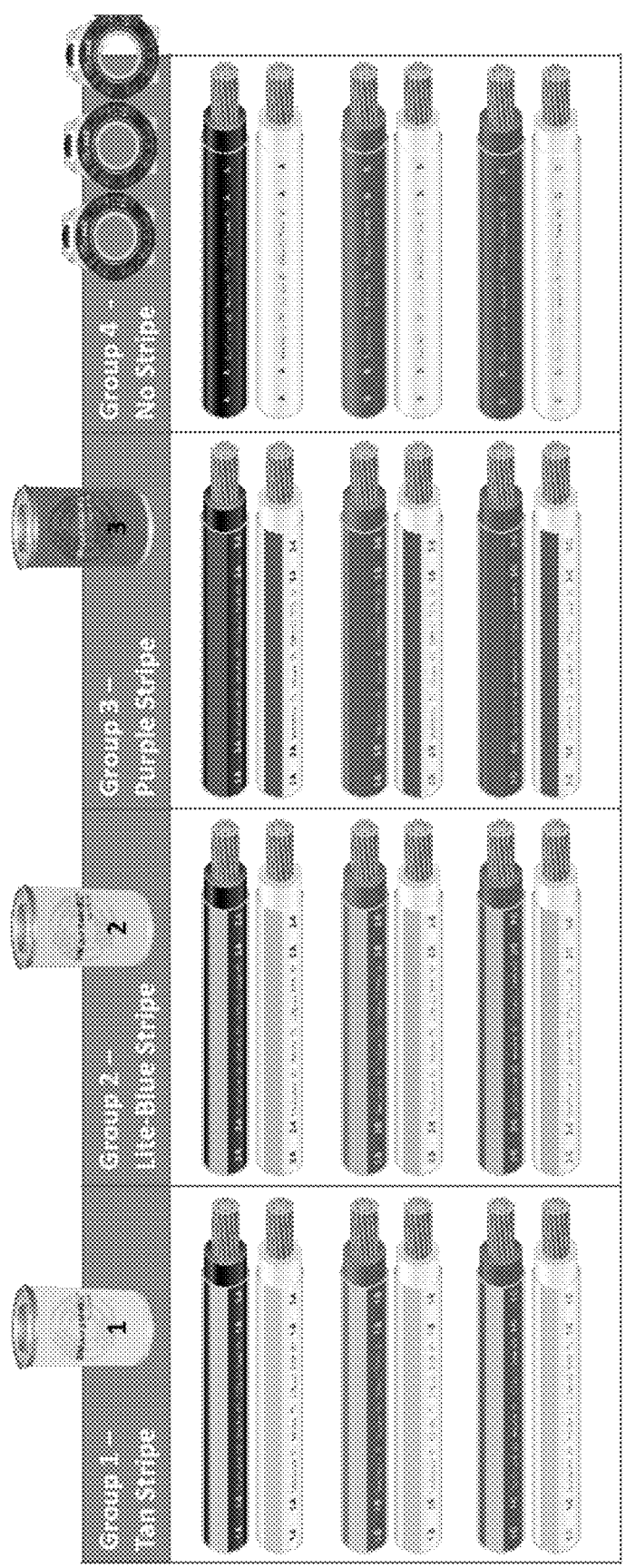
FIG. 4B shows an example of a circuit grouping system where the set indicator comprises a colored stripe on three of the four conductor sets of the system, and the absence of a colored stripe on the remaining conductor set.

Generally, the indicators on the conductors within a conductor set or circuit grouping system are not limited to any particular type, and can be any that effectively convey the intended information to the installation technician. In certain embodiments, circuit grouping systems contemplated herein can comprise a series of unique set indicators associated with each of the plurality of conductor sets. In certain embodiments, one of the unique set indicators can be the absence of a set indicator that is present as the set indicator for each of the other conductor sets in the circuit grouping system. For instance, as shown in FIG. 4B, the circuit grouping system can comprise four conductor sets, three of which comprise a set indicator comprising a stripe, and a fourth conductor set lacking the stripe present on the remaining three conductor sets. In this manner, the absence of a stripe conveys that the conductor belongs to the conductor set lacking a stripe.

Circuit grouping systems described herein can be designed that allow circuits to be grouped without concern that the conductor identifications within any particular grouping may be redundant or degenerate within the circuit grouping, once installed in a circuit housing run. Although the circuit grouping systems contemplated herein are not limited by the amount of conductors in the circuit grouping system, the systems can comprise a number of conductors that approximates or slightly exceeds the maximum allowed capacity of a selected circuit housing. Similarly, circuit grouping systems can comprise any number of conductor sets that provide utility or convenience to a particular electrical system or installation thereof. In certain embodiments, the amount of conductors in the circuit grouping system can be at least about 5 conductors, at least about 10 conductors, at least about 20 conductors, at least about 50 conductors, or at least about 100 conductors. Alternatively, the amount of conductors can be in a range from about 5 conductors to about 100 conductors, or from about 10 conductors to about 50 conductors. The amount of conductors can also be expressed as an amount of conductor pairs, such that a circuit grouping system comprising 20 conductors can comprise 10 conductor pairs. Accordingly, circuit groupings consisting of 10 circuits can be advantageously supplied by a circuit grouping system comprising at least about 10 conductor pairs (e.g. 10 conductor pairs, 12 conductor pairs, or 15 conductor pairs).

Similarly, the conductors of a circuit grouping system can be divided among any appropriate number of conductor sets as required by the electrical system design. In certain embodiments, the circuit grouping system can comprise from 2 to about 10 conductor sets, from 2 to 5 conductor sets, from 3 to 5 conductor sets, or 4 conductor sets. For electrical systems comprising a three-phase power source, it can be advantageous to provide conductor sets comprising three conductor pairs, such that each conductor pair within a set can be associated with a particular phase of the power source. Thus, as shown in FIG. 4, a circuit grouping system can comprise 12 conductor pairs across four conductor sets, such that each conductor set comprises three conductor pairs. One or more of the conductor sets can further comprise a ground conductor.

The circuit grouping systems can comprise conductors sets packaged as a group of conductors, separately-packaged conductors, or both. Group-packaged conductor sets allow each conductor to be pulled from the packaging at once, and can provide efficiency to the installer (e.g., where each conductor pairs of a conductor set can be pulled simultaneously from a barrel). Alternatively, separately packaged conductor pairs allow each conductor pair to be pulled from its packaging independent from other components of the conductor set (e.g., where each conductor pair of a conductor set is packaged on an independent coiled reel). Separately packaged conductor pairs can be used to supplement the installation of conductors, when less than all of the conductors within a conductor set are required to complete an installation for a particular circuit group. In certain aspects, circuit grouping systems can comprise three conductor sets consisting of conductors packaged as a group and one conductor set comprising separately packaged conductor pairs. Optionally, one or more of the conductor sets can comprise a ground conductor.

Coded Circuit Wiring Diagrams

Coded circuit wiring diagrams described herein offer improvements relevant to the design, communication, and installation of electrical systems, particularly for complicated electrical systems comprising numerous branch circuits, circuit housing runs, and electrical panels. The coded circuit wiring diagrams contemplated herein are not limited by the format or style, and generally can be in any format that conveniently and efficiently communicates the information required for installation of electrical systems using the circuit grouping systems disclosed herein. In certain embodiments, coded circuit wiring diagrams can include diagrammed circuit groupings and associated circuit housing schemes that guide the installation of branch circuits. Coded circuit wiring diagrams of the type described herein can be produced from a set of requirements (i.e., by an electrical engineer using a blueprint) or by coding an existing circuit wiring diagram to convey additional information useful to the installation team (e.g., electrical contractors, general contractors, installation technicians, etc.). Thus, a coded circuit wiring diagram can be, in some embodiments, a conventional circuit wiring diagram that has been coded to include circuit identifiers associated with the diagrammed circuits therein. Generally, the coded circuit wiring diagrams contemplated herein provide an intuitive representation that associates the diagrammed circuits of a circuit wiring diagram with a particular component of a circuit grouping system. Coded circuit wiring diagrams disclosed herein can comprise such a representation for any or all of the branch circuits to be installed in a circuit wiring diagram. Circuit housing runs also can be represented and assigned to diagrammed circuit groups.

Coded circuit wiring diagrams are not limited to any particular source, in any particular format, or by any particular method. For instance, the coded circuit wiring diagram can be a printed copy, or an electronic format. Generally, electronic formats capable of carrying metadata associated with the coded circuit wiring diagram and its elements can be advantageous, and can include electronic file formats compatible with Revit®, AutoCAD®, Bluebeam®, or any combination thereof. Electronic formats lacking such metadata (e.g. PDF, PNG, or other image files) also can be acceptable. As referenced herein, non-limiting examples of metadata can include circuit data, circuit grouping data, timestamps, file size, etc.

Installations of electrical systems can require a large and complex network of branch circuits, and the coded circuit wiring diagrams disclosed herein are not restricted from application to any particular electric system. Thus, coded circuit wiring diagrams contemplated herein can comprise any number of diagrammed circuits, whether typical or exceptional for residential, commercial, and/or industrial applications. Any or all of the diagrammed circuits can be associated with a coded circuit identifier. In certain embodiments, coded circuit wiring diagrams can comprise at least 20 coded circuit identifiers, at least 50 coded circuit identifiers, at least 100 coded circuit identifiers, at least 200 coded circuit identifiers, at least 500 coded circuit identifiers, at least 1,000 coded circuit identifiers, at least 5,000 coded circuit identifiers, or at least 10,000 coded circuit identifiers. In other embodiments, the circuit wiring diagram can comprise from about 20 to about 10,000 coded circuit identifiers, from about 100 to about 5,000 coded circuit identifiers, from about 200 to about 2,000 coded circuit identifiers, or from about 500 to about 2,000 coded circuit identifiers. Each coded circuit identifier independently can represent a branch circuit of the electrical system.

Similarly, any or all of the circuit identifiers can be part of a circuit housing scheme. In certain aspects, the coded circuit wiring diagram can comprise at least 2 circuit housing schemes, at least 5 circuit housing schemes, at least 10 diagram circuit housing schemes, at least 20 circuit housing schemes, at least 50 circuit housing schemes, at least 100 circuit housing schemes, at least 500 circuit housing schemes, or at least 1,000 circuit housing schemes. Further, each of the circuit housing schemes independently can comprise from 2 to about 500 coded circuit identifiers, from 2 to about 100 coded circuit identifiers, from 2 to about 50 coded circuit identifiers, from about 2 to about 20 coded circuit identifiers, or from about 5 to about 15 coded circuit identifiers.

Generally, coded circuit wiring diagrams can comprise a circuit housing scheme comprising a plurality of coded circuit identifiers, wherein each of the coded identifiers correlates to a unique component of a circuit grouping system. Coded circuit identifiers can comprise a circuit name to identify the circuit (e.g., a circuit number, symbol, text string, etc.), a phase indicator (e.g., a text color), and a set indicator (e.g., a symbol). Unique components of a circuit grouping system correlated to the coded identifiers can be any described herein. For instance, the coded identifiers can be correlated to conductor identifications comprising indicators representing the function, set, and phase of conductors of a circuit grouping system, e.g., a phase indicator of the coded circuit identifier can correlate to that of the conductor.

The phase and set indicators are not limited to any particular form, and can be any that are generally convenient and compatible with presentation as a group of coded circuit identifiers (i.e., a circuit housing scheme) in the coded circuit wiring diagram. For example, each phase indicator of the coded circuit identifier comprise a circuit name text color that matches the phase color of a corresponding component of the circuit grouping system, and selected from a conventional color scheme. Similarly, the set indicator of the coded circuit identifier can comprise a set color that matches the set color of a corresponding component of a circuit grouping system, and selected from a color that is not part of a conventional color scheme.

The arrangement of coded circuit identifiers within a circuit housing scheme can be any that effectively correlate an associated branch circuit to a component of the circuit grouping system, and convey the circuit name, phase indicator, and set indicator. In certain embodiments, the coded circuit identifiers can be arranged as an array, with rows and columns of circuit names grouped according to characteristics that the branch circuits have in common. For instance, the circuit names of branch circuits having the same phase can be arranged in the same row of the array, whereas branch circuits having the same set can be arranged in the same column. In this manner a set or phase indicator can be associated with each row or column that signals the relevant characteristic in a compressed manner. The phase or set may also be represented by the text color of the circuit name, or the background color of the array entry, such that each coded circuit identifier can be read independently to determine the circuit name, phase, and set of the associated diagrammed circuit.

Figure 5:
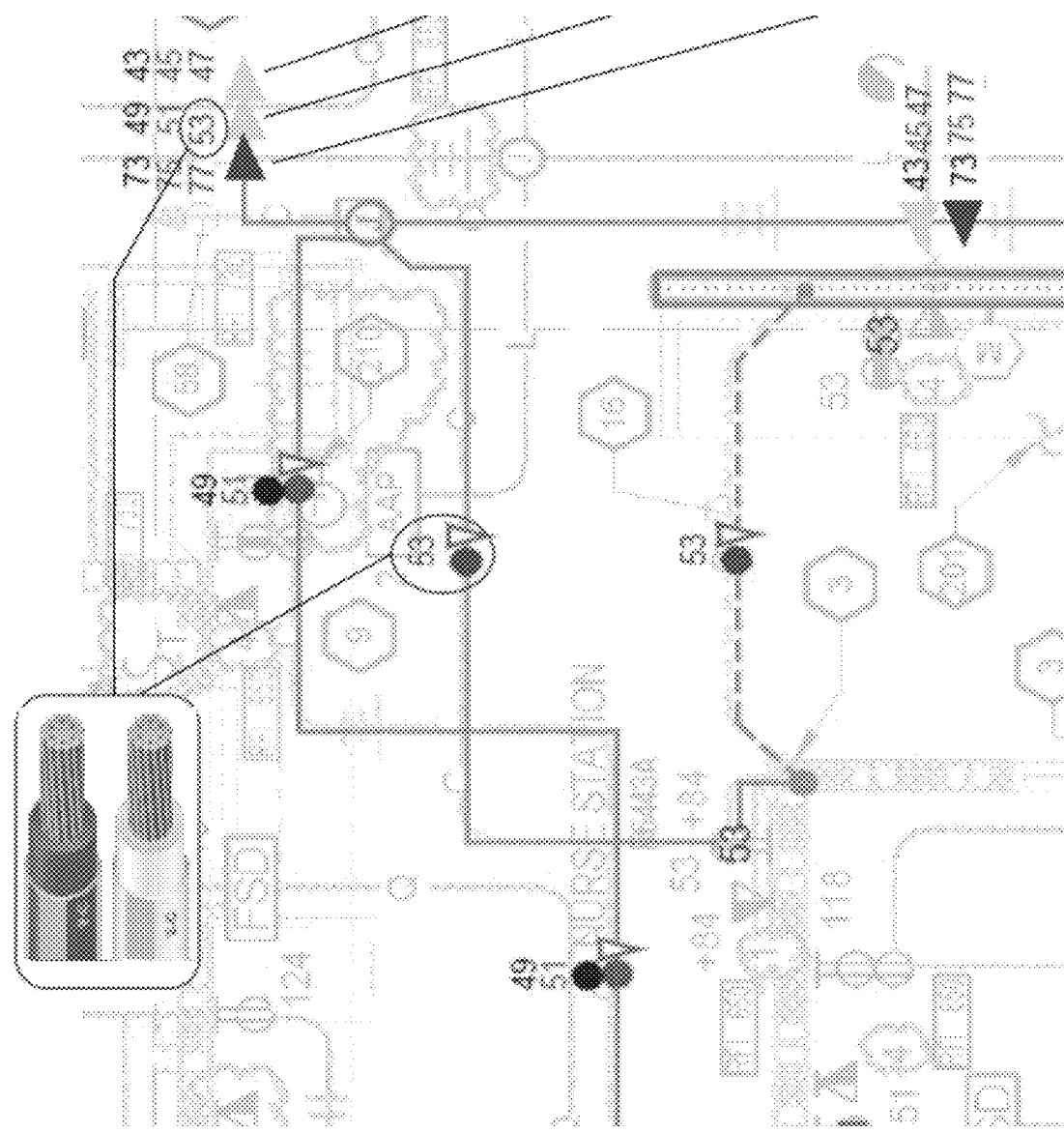
FIG. 5 shows a partial coded circuit wiring diagram comprising a circuit housing scheme comprising an array of coded circuit identifiers, each representing a diagrammed circuit in the coded circuit wiring diagram.

FIG. 5 shows a portion of a coded circuit wiring diagram comprising a circuit housing scheme representing nine diagrammed circuits (43, 45, 47, 49, 51, 53, 73, 76, and 77). An array of circuit numbers representing each diagrammed circuit in the group is provided. Phase A circuits (43, 49, and 73) are presented in the same row, as are phase B circuits (45, 51, and 75), and phase C circuits (47, 53, and 77). Each column is associated with a triangular set indicator beneath the array, indicating the set of the diagrammed circuits in the particular column. Further, each of the circuit numbers has a text color corresponding to the phase. In this manner, an installation technician may quickly reference the coded circuit wiring diagram to determine which component of a circuit wiring system to install for any or all of the given diagrammed circuits. For instance, diagrammed circuit 53 will require the blue phase C conductor pair from the light blue set of the circuit grouping system. The technician can then quickly identify the conductor pair with a load conductor having a blue background and neutral conductor having blue text, each with a light blue stripe, and load the conductor pair in the conductor housing. Alternatively, without relying on any chromatic indicators the technician may rely on the numbered text 2 indicating the second set, and the letter C indicating the phase of each conductor.

The coded circuit identifiers, as described, can be grouped together to form circuit housing schemes, and these circuit housing schemes corresponding to a diagrammed circuit group in the circuit wiring diagram. The amount of coded circuit identifiers in any circuit housing scheme, and thus diagrammed circuits in a diagrammed circuit group, can be dependent on the maximum allowed capacity of an associated circuit housing run. This maximum allowed capacity can be predetermined, such as by building codes that restrict the number of conductors that can be housed within a single circuit housing, or directly dependent on a diameter (and capacity) of a specific circuit housing run provided by the circuit wiring diagram.

In certain embodiments, each coded circuit identifier can be correlated to a conductor pair of a circuit grouping system, the conductor pair comprising a load conductor and neutral conductor. In this manner, a diagrammed circuit can be easily identified in the circuit wiring diagram, and correlated to the specific conductor pair to be installed (or ordered). Generally, the circuit name can comprise a circuit number, and the circuit number can be correlated to a terminal of an electrical panel. For instance, a diagrammed circuit may be configured to be connected to terminal 19 of an electrical panel, and represented by the number 19 within a circuit housing scheme of the coded circuit wiring diagram.

A circuit grouping system may comprise a plurality of conductors, each having a unique conductor identification to distinctly identify the conductor within the system. The conductor identification can include first and second indicators, independently correlated to branch circuit characteristics (e.g., function, phase). In certain aspects, the coded circuit identifier can be correlated to a conductor, or a conductor pair of a circuit grouping system. Where the coded circuit identifier is correlated to conductor pair, the conductor pair can comprise both a load conductor and neutral conductor as part of the same branch circuit, and therefore having otherwise identical branch circuit characteristics. Accordingly, a coded circuit identifier representing the phase and set of a conductor pair may be sufficient to correlate the diagrammed circuit of a coded circuit wiring diagram to a conductor pair of a circuit grouping system.

The coded circuit identifiers can comprise any number of indicators independently the same or different from corresponding conductor indicators in a circuit grouping system. For instance, where a conductor of a circuit grouping system comprises a phase indicator comprising a background color and a set indicator comprising a symbolic indicator, the circuit identifier can comprise a branch circuit identifier associated with the background color and the symbolic indicator. Alternatively, the conductors of a circuit grouping system may comprise multiple indicators, such that any branch circuit identifier may correspond to a unique component of the circuit grouping system by any combination of chromatic or symbolic indicators.

A representative example of a partial coded circuit wiring diagram is shown in FIG. 5, where a conventional circuit wiring scheme has been coded to include a circuit housing scheme comprising several diagrammed circuit groups. In the coded circuit wiring diagram represented in FIG. 5, each of the diagrammed circuits has a circuit name comprising a numeral taken from the conventional diagrammed circuit, but regrouped and formed into an array of circuit names. Each circuit name has been assigned a text color correlated to the conventional phase color for a 120V system to serve as the phase indicator. Each circuit name having the same phase is also arranged within the same row or column of the array, and a symbol is associated with each column of circuit names. The symbol comprises a set color correlated to a set of a circuit grouping system, and is selected from colors that are not in the conventional 120V scheme. Taken together, the circuit name, text color, and associated symbol comprise a coded circuit identifier, and the array of coded circuit identifiers comprises a circuit housing scheme for the diagrammed circuit group.

Methods for Coding a Circuit Wiring Diagram

Methods for coding a circuit wiring diagram are described herein and are directed to providing a roadmap for the efficient installation of branch circuits in an electrical system. Generally, the methods disclosed herein can employ, or correspond to, the conductor sets and circuit grouping systems described above. Particularly, methods for coding a circuit wiring diagram based on information from a conventional circuit wiring diagram can streamline the installation of electrical systems for an electrical contractor, without requiring additional input or cooperation with a general contractor or the electrical engineer that produced the conventional circuit wiring diagram. In this manner, installation efficiency may be improved independently from the conventions and limitations of other portions of the workflow.

Figure 6:
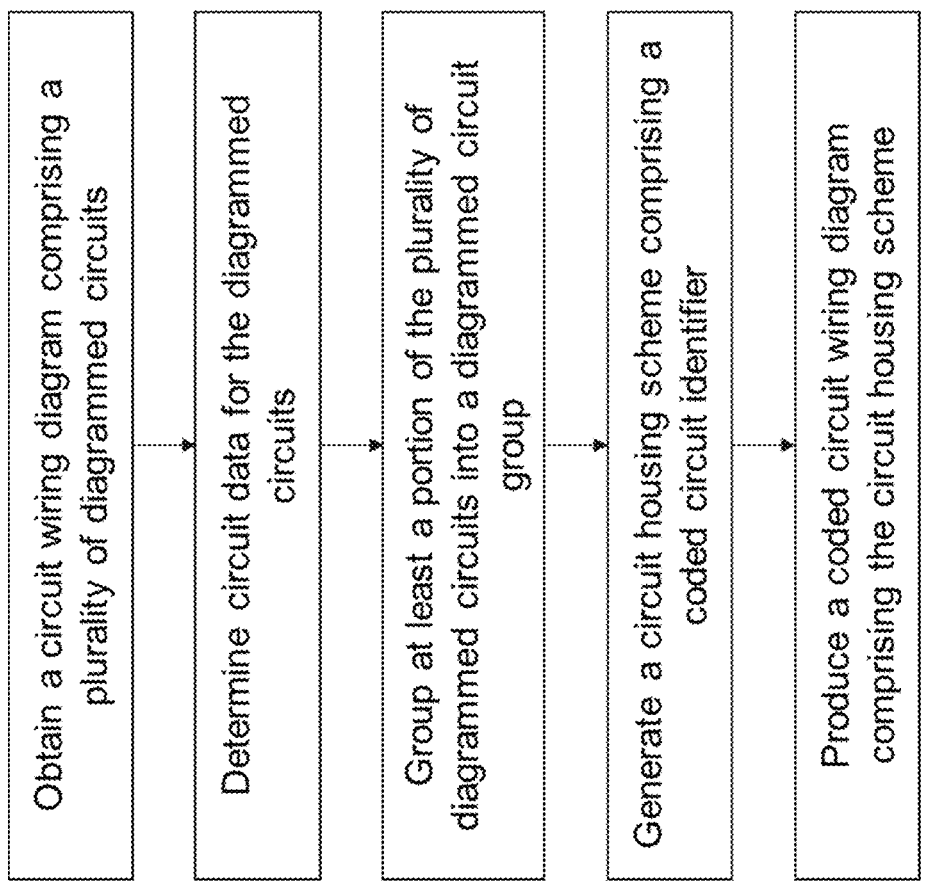
FIG. 6 is a flow diagram depicting steps of the method for coding a circuit wiring diagram.

Generally, the methods described herein can comprise the steps of obtaining a circuit wiring diagram, determining a set of circuit characteristics from the circuit wiring diagram or its metadata, grouping a portion of diagrammed circuits into a diagrammed circuit group, generating a circuit housing scheme comprising a circuit name, a phase indicator, and a set indicator for each diagrammed circuit in the diagrammed circuit group, and producing a coded circuit wiring diagram comprising the circuit housing scheme. These steps are outlined in the flow diagram of FIG. 6. The phase and set indicators of the circuit housing scheme can correspond to a unique component of a circuit grouping system, such as those described herein.

The methods contemplated herein also may comprise additional steps, such as entering data related to the electrical system to be installed and/or displaying any combination of the entered data or outputs generated during steps of the coding methods, including but not limited to the circuit wiring diagram, the diagrammed circuit group, and the circuit housing scheme. In embodiments comprising a displaying step, any of the circuit wiring diagram, diagrammed circuits, coded circuit wiring diagram, diagrammed circuit groups, circuit housing schemes, circuit data, etc., may be displayed at any time and in any manner during the method that may be useful or of interest to the user. For instance, the circuit wiring diagram can be displayed on a computing device prior to grouping the diagrammed circuits in order to allow the user to visualize the arrangement of diagrammed circuits in the circuit wiring diagram. Similarly, existing diagrammed circuit groups can be displayed, either as a numerical list, or as an overlay on the circuit wiring diagram in order to track progress during the grouping or assigning steps.

Moreover, those of ordinary skill in the art will recognize that each step of the inventive methods for coding circuit wiring diagrams disclosed hererin, or portions thereof, can be conducted manually or automatically. In certain embodiments comprising an automated step, or an automated portion of a step, the automated portion can be conducted using a computing device. Similarly, manual steps can be conducted with the aid of computing devices in order to store and display information related to the circuit grouping methods, even where no computation is required. Each step of the circuit grouping methods disclosed herein, or portion thereof, may independently be conducted on, or with the assistance of, any suitable computing device. For example, an electrical contractor can obtain a circuit wiring diagram, group a plurality of diagrammed circuits, and generate a circuit housing scheme on a personal computer. Optionally, the electrical contractor or an on-site technician can enter information related to the electrical system and/or display any of the related information on a handheld device in order to assist the circuit grouping. Suitable computing devices for the methods described herein are not limited to any particular device, and can include tablet devices, mobile devices, handheld devices, smartphones, telephones, personal computers, network computers, and any combination thereof.

Certain embodiments of the methods to produce a coded circuit wiring diagram can be applicable to produce any of the coded circuit wiring diagrams disclosed above. In certain embodiments, the methods can comprise producing a coded circuit wiring diagram comprising at least 20 diagrammed circuits, at least 50 diagrammed circuits, at least 100 diagrammed circuits, at least 200 diagrammed circuits, at least 500 diagrammed circuits, at least 1,000 diagrammed circuits, at least 5,000 diagrammed circuits, or at least 10,000 diagrammed circuits. In other embodiments, the circuit wiring diagram can comprise from about 20 to about 10,000 diagrammed circuits, from about 100 to about 5,000 diagrammed circuits, from about 200 to about 2,000 diagrammed circuits, or from about 500 to about 2,000 diagrammed circuits.

Similarly, the circuit wiring diagram can comprise at least 2 diagrammed circuit groups, at least 5 diagrammed circuit groups, at least 10 diagrammed circuit groups, at least 20 diagrammed circuit groups, at least 50 diagrammed circuit groups, at least 100 diagrammed circuit groups, at least 500 diagrammed circuit groups, or at least 1,000 diagrammed circuit groups. Further, each of the diagrammed circuit groups independently can comprise from 2 to about 500 diagrammed circuits, from 2 to about 100 diagrammed circuits, from 2 to about 50 diagrammed circuits, from about 2 to about 20 diagrammed circuits, or from about 5 to about 15 diagrammed circuits. Thus, one of ordinary skill in the art will appreciate that the circuit grouping methods disclosed herein remain applicable even in the context of relatively large and complex electrical systems.

Methods disclosed herein are not limited to obtaining the circuit wiring diagram from any particular source, in any particular format, or by any particular method. For instance, an electrical contractor can receive a printed copy of the circuit wiring diagram, and generate a coded circuit housing scheme based on the information therein. Alternatively, the circuit wiring diagram can be received in an electronic format (e.g., AutoCAD, Revit, Bluebeam, PDF, etc., as recited above) on a computing device, for instance via email or a shared server from the electrical engineer.

Circuit data can be determined by any or all of extracting circuit data from the circuit wiring diagram, accepting user input data, calculating circuit data, referencing building codes, depending on what may be appropriate according to the format of the circuit wiring diagram. For instance, obtaining the circuit wiring diagram in an electronic Revit format can allow extracting metadata related to the diagrammed circuits of the circuit wiring diagram. On the other end of the spectrum, where the circuit wiring diagram is obtained as a printed or electronic image without metadata, circuit data can be obtained by simple measurement and/or calculation.

The circuit data can encompass any data that is relevant to the installation of the branch circuits in an electrical system. For instance, determining circuit data can include determining a circuit name, length, phase, endpoint location, associated electrical panel, electrical panel terminal assignment, capacity, phase, grouping, associated circuit housing run, etc., or any combination thereof. Determining circuit data may also comprise determining characteristics and requirements for any number of electrical elements in a circuit wiring diagram, and collating those requirements into circuit data. For instance, each electrical element in an electrical system can be input, and assigned to an electrical panel based on its location and other characteristics. Each element can then be assigned to a given circuit depending on the capacity of the circuit, and proximity of the electrical elements. Each of the circuits can be assigned to an electrical panel in a similar manner. In certain embodiments, determining the circuit data can comprise calculating a secondary parameter based on one or more primary circuit characteristics. Determining the phase of a circuit, where it may not be inherent in the circuit wiring diagram, or where a new circuit phase is to be determined, can include determining a circuit number, calculating a modulus of the circuit number, and referencing the modulus to a conventional electrical panel layout that matches the associated electrical panel present in the circuit wiring diagram.

Once the circuit data has been determined, a grouping step to form diagrammed circuit groups can be conducted, where at least a portion of the diagrammed circuits in the circuit wiring diagram are assigned to a diagrammed circuit group. In certain embodiments, the grouping step can comprise displaying the circuit wiring diagram and allowing a user (e.g., the electrical engineer, electrical contractor, technician) to manually group the diagrammed circuits, for example, by manually entering the diagrammed circuits into a form. Alternatively, the grouping step can be conducted automatically, for example, by using a computing device to determine an optimal or acceptable diagrammed circuit group for the diagrammed circuits. In certain embodiments, the grouping step can comprise automatically grouping the diagrammed circuit groups and allowing a user to manually confirm the grouping and/or make adjustments to the circuit grouping. Alternatively, in certain embodiments, the grouping step can comprise adopting a pre-existing grouping determined from the circuit wiring diagram.

The grouping step can be based on any number of factors as discussed below (e.g., the location of the diagrammed circuits within the circuit wiring diagram, parameters of available circuit housing, and characteristics of the electrical panel associated with the branch circuits). For example, grouping the diagrammed circuits of a circuit wiring diagram based on parameters of the circuit housing can drive efficiency by minimizing the amount of circuit housing runs, and thereby reduce the amount of the material and labor required for installation of the electrical system. As such, the grouping step is not limited to any particular method, and can be any that result in efficiently grouped diagrammed circuits. In certain embodiments, the location of the circuit endpoints can be used to group the diagrammed circuits into diagrammed circuit groups based on their proximity, then assigned an appropriate circuit housing run size and length to accommodate the diagrammed circuits in the group. Alternatively, the grouping step can be based on a maximum allowable circuit housing run capacity, with the goal of grouping the diagrammed circuits in a manner that can maximize (or achieve a target fill percentage) the actual capacity of each circuit housing run once installed. In certain embodiments, the grouping step can comprise selecting an electrical panel in the circuit wiring diagram, identifying an amount of diagrammed circuits associated with the electrical panel and a maximum circuit housing capacity, assigning the diagrammed circuits to a diagrammed circuit group based on the proximity of endpoints of the diagrammed circuits. Advantageously, the amount of diagrammed circuits assigned to the diagrammed circuit groups can exceed a target fill percentage, but not exceed the maximum circuit housing capacity. In certain embodiments, the assignment of diagrammed circuits to a diagrammed circuit group can be independent of the phase of the circuit.

The target fill percentage can be characterized based on a single diagrammed circuit group, or as the aggregate of all diagrammed circuit groups in a circuit wiring diagram. In an ideal installation, the fill percentage would be equal to the maximum allowed capacity of the circuit housing run(s), eliminating any waste of material or labor associated with installing more circuit housing runs than minimally required to complete the installation. Conventional methods where diagrammed circuit groups are assigned by the electrical engineer may not be able to reliably group the circuits based on a target fill percentage, based on the need to regroup the circuits on-the-fly by the installation technician, or the electrical contractor, once the redundancy of circuits within a given group is detected. Even where redundancy in labeling is taken into consideration in the initial grouping of circuits, electrical engineers may be limited to a target fill percentage of less than 30% without the benefit of the circuit grouping systems described herein. For instance, where a maximum circuit housing capacity is 10 circuits for an installation of a 3-phase electrical system, an electrical engineer would not be able to place more than 3 circuits in any group without introducing redundancy in the circuit labeling, leading to an additional on-site tagging step. In contrast, the grouping steps disclosed herein can employ a target fill percentage of at least about 50%, at least about 60%, at least about 70%, at least about 80%, at least about 90%, or at least about 95%, for individual circuit housing runs, and/or for the aggregate amount of circuit housing runs in an electrical system.

In certain aspects, the diameter of the circuit housing can determine the maximum circuit housing capacity. In certain embodiments, a diameter of the circuit housing can be in a range from about 0.1 inches to about 10 inches, from about 0.25 inches to about 8 inches, from about 0.5 inches to about 5 inches, from about 0.75 inches to about 4 inches, or from about 1 inch to about 3 inches. In particular, these ranges include common conduit diameters such as 0.5 inches, 0.75 inches, 1 inch, 1.25 inches, 1.5 inches, 2 inches, 3 inches, and any combination thereof.

Circuit housings are not limited to any particular material or size, and can generally be any circuit housing suitable for the methods described herein. In certain embodiments, the circuit housing can comprise any of those typically used for housing conductors in commercial and industrial applications including, but not limited to rigid conduit, flexible conduit, metal conduit (e.g., EMT conduit, IMC, galvanized tubing), and plastic conduit (e.g., PVC). Alternatively, or additionally, the circuit housing can comprise prefabricated extruded cables based on the diagrammed circuit groups produced by the methods disclosed herein. Such embodiments may not require additional circuit housing during installation; however, a secondary circuit housing (e.g., conduit) can be supplied to further protect prefabricated cables, or consolidate multiple prefabricated cables or circuit housing runs.

With respect to a circuit wiring diagram, or a particular electrical panel within a circuit wiring diagram, a minimum amount of diagrammed circuit groups can be determined by considering the amount of diagrammed circuits contained therein and the maximum circuit housing capacity. For instance, where the maximum circuit housing capacity is 10 circuits, and an electrical panel has 42 associated diagrammed circuits, the minimum amount of diagrammed circuit groups to accommodate the diagrammed circuits can be calculated as the integer quotient of the diagrammed circuits divided by the maximum circuit housing capacity, plus one to include any remaining circuits. In this non-limiting example, a minimum of 5 diagrammed circuit groups are required to encompass the 42 diagrammed circuits.

The efficiency of the grouping step also may be measured as the ratio of the amount of diagrammed circuit groups to the minimum amount of diagrammed circuit groups required to group each of the diagrammed circuit groups of a circuit wiring diagram, electrical panel, etc. In certain embodiments, this ratio can be less than about 4:1, less than about 3:1, less than about 2:1, or less than about 1.4:1.

The grouping step can serve to assign a selected amount of diagrammed circuits to components of a circuit grouping system. The grouping step therefore can comprise selecting any number of diagrammed circuits as a subset of an entire number of diagrammed circuits. For instance, where multiple electrical panels are present in an electrical system design, the diagrammed circuits associated with a single electrical panel can be grouped independently of other diagrammed circuits in the circuit wiring diagram. Alternatively, all of the diagrammed circuits in a circuit wiring diagram can be assigned in a single step. After selecting the diagrammed circuits to be grouped, identifying a maximum group size (e.g., based on the maximum allowed capacity of a circuit housing run) can inform the selection of a circuit grouping system to be used. For example, where a maximum allowed capacity of circuit housing runs is 10 conductor pairs, the maximum group size can be 10 diagrammed circuits and a circuit grouping system comprising 10 unique conductor pairs can be selected. As stated above, the amount of conductor pairs, amount of diagrammed circuits, maximum allowed capacity, etc. are not limited to any particular amount.

Figure 7:
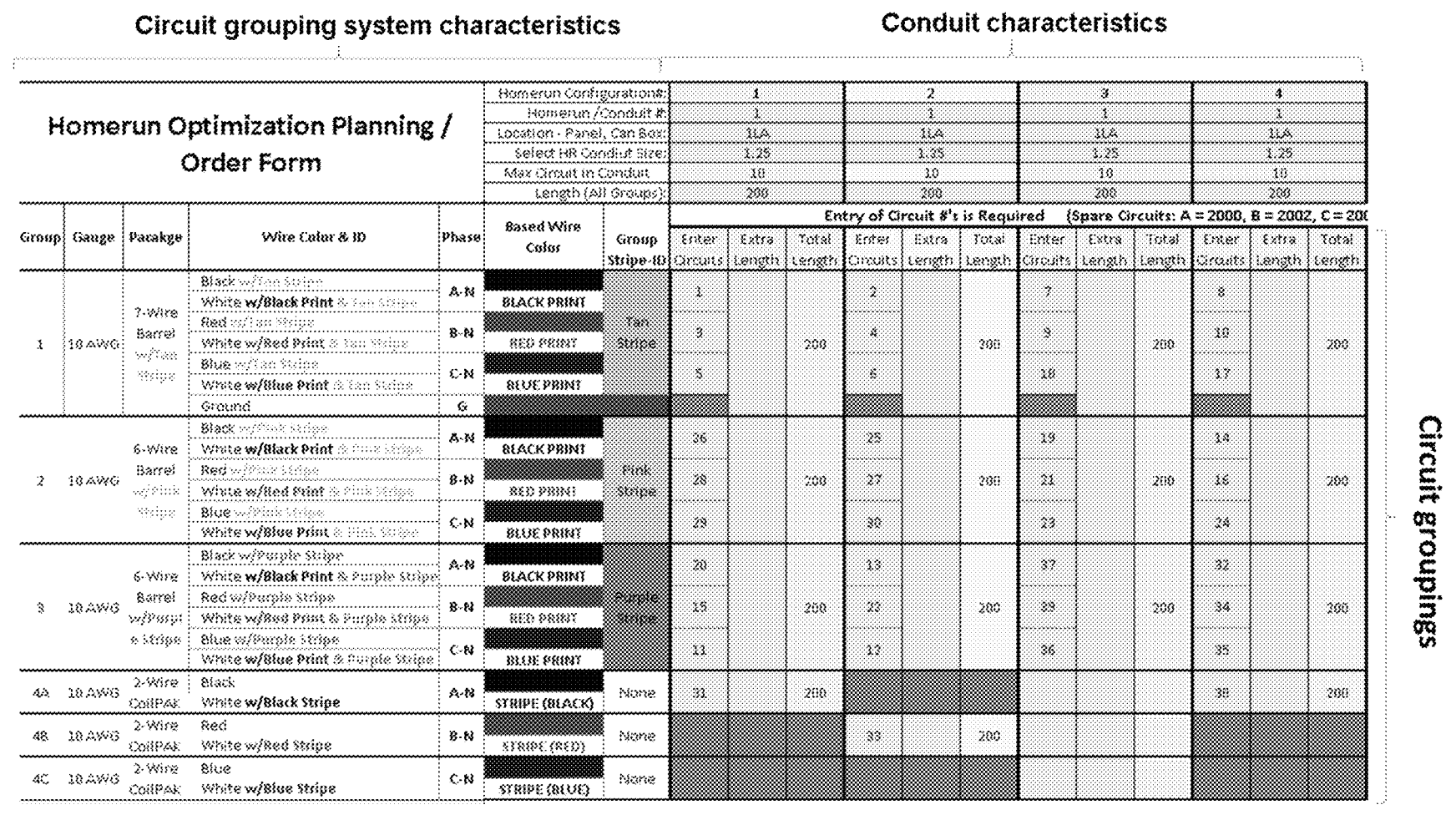

Assigning the selected diagrammed circuits, according to the identified group size, can coordinate each diagrammed circuit to a specific a circuit housing run within the electrical system, and ensure the conductors installed within the circuit housing run are uniquely labeled. FIG. 7 provides a representative example of an interface capable of facilitating the assignment of diagrammed circuits to diagrammed circuit groups, and to unique components of the selected circuit grouping system. In FIG. 7, each component of a circuit grouping system is represented within a row of the first series of columns to show to the user which components are generally available for assignment within the grouping step. Adjacent columns identify a given group by a group name and characteristics of the associated circuit housing run. The identifying information can be derived from the circuit data determined from the circuit wiring diagram in previous steps, or determined de novo based on user input data. Thus, a user (e.g., electrical engineer, electrical contractor) can enter data related to the circuit housing run in the header fields of each column including, but not limited to, the circuit housing diameter, length, maximum allowed capacity, location in the electrical system, and characteristics of the electrical panel. Alternatively, the data can be automatically populated from the circuit data. In certain embodiments, the interface can automatically determine the amount of components of the selected circuit grouping system that are available to be selected, equal to the maximum allowed capacity of the circuit housing, and limit the fields available for assignment to those components.

At this point, the selected diagrammed circuits can be entered into the available fields, either manually or automatically, based on any appropriate circuit data (e.g., the proximity of homerun endpoints, phase of the diagrammed circuits, etc.). As the fields are filled, an interface as shown in FIG. 7 can aid the grouping of diagrammed circuits by displaying the remaining capacity a particular circuit housing run and allow the user to make a pragmatic assignment, or rearrange assignments as needed. Alternatively, the assignments can be optimized automatically by any selected predetermined metric, or set of metrics. The interface assisting the assigning step also can serve as an order form comprising amounts of each component of the circuit grouping system and/or circuit housing runs.

Once the diagrammed circuits of a circuit wiring diagram have been assigned to a particular diagrammed circuit group, the circuit data associated with each diagrammed circuit can be updated to reflect the new grouping and any other identification data that may differ from the originally determined circuit data from the conventional circuit wiring diagram. For instance, diagrammed circuits can be renumbered after being assigned to a diagrammed circuit group such that the circuit name, phase, and set of each circuit is optimized within any given diagrammed circuit group, in order to best correlate with components of the circuit grouping system.

A circuit housing scheme can be generated to correlate the groupings and circuit data to a component of a circuit grouping system disclosed herein, and to convey the information to the installation team. In certain embodiments, generating a circuit housing scheme for a particular diagrammed circuit group can comprise generating an array of circuit names of the diagrammed circuits in the group, wherein the circuit name of each diagrammed circuit having the same phase is placed in either the same row or column of the array. In certain embodiments, generating a circuit housing scheme also can comprises generating a set indicator associated with a column or row of the array. In this manner, diagrammed circuits can be assigned to subgroups within the diagrammed circuit group, and correlated to a unique component of a circuit grouping system. For example, when the circuit names of circuits having the same phase are placed in rows, each set indicator can be associated a column of the array, such that each phase A circuit is associated with a different set of the circuit grouping system, and no redundancy occurs within the circuit housing scheme.

It can be advantageous for the format and style of the circuit housing scheme to match that of the circuit grouping systems disclosed herein, to facilitate an intuitive correlation. Thus, any format or style of the set and phase indicators described above that can be incorporated into the circuit housing scheme are appropriate. For example, each phase indicator in the circuit housing scheme can comprise a circuit name text color that matches the phase color of a corresponding component of the circuit grouping system, and selected from a conventional color scheme as discussed above. Similarly, the set indicator in the circuit housing scheme can comprise a set color that matches the set color of a corresponding component of a circuit grouping system, and selected from a color that is not part of a conventional color scheme, as discussed above.

Once generated, the circuit housing scheme can be incorporated into a coded circuit wiring diagram by modifying the original, conventional circuit wiring diagram to substitute the original circuit identifiers with the circuit housing scheme. Certain embodiments can include a simple overlay of the circuit housing scheme over the original circuit wiring diagram as a separate digital layer. This may be accomplished by fading the intensity of the underlying original diagram, and providing the circuit housing schemes in more intense or vibrant color. Alternatively, the circuit identifiers of the original circuit wiring diagram may be deleted, and replaced by the circuit housing schemes. Other components of the original circuit wiring diagram also may be modified to enhance the visualization of the circuit housing schemes in the coded circuit wiring diagram, to provide clarity to the installers during the branch circuit installation.

Given that there can be any number of diagrammed circuits and diagrammed circuit groups in a circuit wiring diagram, it follows that amount of circuit housing schemes in a coded circuit wiring diagram can be equal to, or approach, the number of diagrammed circuit groups in the circuit wiring diagram. For that reason, producing a coded circuit wiring diagram can comprise producing a circuit housing scheme for each diagrammed circuit group in the circuit wiring diagram. Further, the circuit housing schemes may be oriented within the coded circuit wiring diagram to associate a diagrammed circuit group and its individual components with a circuit housing scheme (and its individual components). Generally, this can result in positioning the circuit housing scheme adjacent to one or more endpoints of a diagrammed circuit in the diagrammed circuit group. Additionally or alternatively, the endpoints of individual circuits of the diagrammed circuit group can overlay the set indicators of a circuit housing scheme.

A circuit housing scheme generated as described herein, that correlates the diagrammed circuits of a circuit wiring diagram to the unique components of a circuit grouping system, can be useful to both produce a coded circuit wiring diagram as an installation guide for technicians, and as an efficient mechanism to generate a material order based on the amount of each component of the circuit grouping system that is required to complete the installation. In certain embodiments, the methods for coding circuit wiring diagrams can further comprises generating a material order based on the circuit data. The circuit data may comprise circuit length to determine an amount of a component of a circuit grouping system to be ordered. The circuit data may also comprise an amount of diagrammed circuits in a diagrammed circuit group, and a length of an associated circuit housing run to determine both the diameter, length, and type of circuit housing to order.

Conventional methods can result in a large excess of material at the job site, or additional orders and lag time as the materials are delivered while an installation is in progress. The accuracy of the material order generated by the methods described herein can be unexpectedly improved over conventional methods. In certain embodiments disclosed herein, the material order can comprise an amount of any component of the circuit grouping system, circuit housing, and/or any other associated element of the electrical system, within about 30%, within about 20%, within about 10%, within about 5%, within about 3%, within about 2%, or within about 1% of a minimum amount of material required to complete the installation. For instance, a circuit wiring diagram may comprise diagrammed circuits having a composite circuit length of 100,000 ft. (i.e., the total circuit length of all diagrammed circuits in the circuit wiring diagram. In such embodiments, a material order can comprise a total length of conductor pairs of a circuit grouping system within about 10% of 100,000 ft. Additionally, the material order can comprise an amount of material required to complete the installation of branch circuits within a diagrammed circuit group. In such embodiments, the material order also can be within about 30%, within about 20%, within about 10%, within about 5%, within about 3%, within about 2%, or within about 1% of a minimum amount of material required to complete the installation.

Branch Circuit Installation Methods

Generally, the branch circuit installation methods contemplated herein are directed to the efficient installation of branch circuits in an electrical system by using the circuit grouping systems and methods provided herein. Circuit installation methods disclosed herein can comprise installing a circuit housing run, and loading the circuit housing run with a plurality of conductors from a circuit grouping system, according to a circuit housing scheme (or coded circuit wiring diagram) that correlates the components of the circuit grouping system with components of an electrical system installation plan (e.g., a circuit wiring diagram). In certain embodiments, installing a circuit housing run can comprise installing a circuit housing run for each of a plurality of diagrammed circuit groups in a circuit wiring diagram. In certain embodiments, loading the circuit housing run can comprise loading the circuit housing run with conductors of a circuit grouping system for each of the plurality of diagrammed circuits within a diagrammed circuit group.

As above, the scale of the circuit installation methods contemplated herein is not limited to any particular amount of conductors, circuits, circuit groups, or circuit housing runs. Installing a circuit housing run can comprise installing any amount of circuit housing runs required for a particular electrical system, and can be dictated by the amount of diagrammed circuit groups in a circuit wiring diagram as described above. In certain embodiments, the circuit installation methods can comprise installing at least 2 circuit housing runs, at least 5 circuit housing runs, at least 10 circuit housing runs, at least 20 circuit housing runs, at least 50 circuit housing runs, at least 100 circuit housing runs, at least 250 circuit housing runs, at least 500 circuit housing runs, or at least 1,000 circuit housing runs.

The steps of the circuit installation methods can be conducted in any order, as convenient to the installation based on the nature of the circuit housing and/or the amount of circuits to be installed. For example, in embodiments where the circuit housing is metal conduit, the metal conduit can be installed at the job site prior to loading the conduit with conductors of the circuit grouping systems disclosed herein. Alternatively, in embodiments where the circuit housing is an extruded cable, a cable manufacturer can prepare a customized extruded cable comprising each of the of conductors of a circuit grouping system required by the circuit grouping scheme; the extruded cable (comprising each of the conductors) can then be delivered to the job site and installed.

It will be apparent to those of ordinary skill in the art that relying on the circuit housing schemes disclosed herein as a roadmap for the installation of branch circuits in an electrical system can be more efficient than conventional circuit installation methods. As it applies herein, conventional installation methods can include, but are not limited to, methods requiring additional on-site tagging steps to distinguish conductors within a given circuit housing run, methods where identically-labeled conductors are installed within a single housing run, and methods where additional conduit is installed to avoid installing identically-labeled conductors within a single conduit housing run.

In certain embodiments, the efficiency of a circuit installation can be measured by the utilization ratio of the installed circuit housing runs. The utilization ratio of a circuit housing run is defined as the number of conductors loaded within a circuit housing run, compared to the maximum allowed capacity of the circuit housing run. Similarly, the average utilization ratio of the circuit housing runs in a given circuit installation can provide a measure of the total material and labor required for the installation. In some instances, the maximum allowed capacity of the conductor housing can be about 60%, or even about 40% of the actual capacity of the circuit housing, such that filling a conduit having an allowed capacity of 40% to an actual capacity of 40% would result in a utilization ratio of 1.0. Similarly, ¾" EMT conduit may be rated to allow four conductor pairs of 10 AWG THHN, leaving room for a ground. Thus, filling a ¾" EMT circuit housing run with only three conductor pairs would lead to a utilization ratio of 0.75. Certain embodiments of the circuit installation methods described herein can result in an average utilization ratio across all diagrammed circuit groups in a circuit wiring diagram can be at least about 0.5, at least about 0.6%, at least about 0.7 at least about 0.75, at least about 0.8, at least about 0.85, or at least about 0.90. Similarly, the average utilization ratio for the circuits installed by the methods disclosed herein can be at least about 0.3, at least about 0.4, at least about 0.5, at least about 0.6, at least about 0.7, at least about 0.8, or at least about 0.9. Improved utilization ratios can be achieved for individual circuit housing runs, a group of circuit housing runs, or the entirety of circuit housing runs required to install an electrical system.

In certain embodiments, the total amount of circuit housing runs required to complete the installation of a given electrical system can be drastically reduced compared to conventional methods. In certain embodiments, the amount of circuit housing runs required to install the branch circuits of an electrical system can be reduced by at least about 5%, at least about 10%, at least about 15%, at least about 20%, at least about 25%, or at least about 40%. It follows that the amount of labor, (as measured by cost, hours, etc.) required to install the branch circuits of a given electrical system may also be reduced by at least about 5%, at least about 10%, at least about 15%, at least about 20%, at least about 25%, or at least about 40%, compared to an otherwise identical method where the branch circuits are labeled at the job site.

Circuit installation methods disclosed herein may also be more efficient with respect to the amount of labor and maintenance required, both in terms of hours and overall cost compared to conventional methods where the on-site tagging may be less durable than marking methods during manufacture. In certain embodiments, the amount of labor and/or maintenance, relative to the amount of hours or overall cost, can be at least about 2% less, at least about 5% less, at least about 10% less, at least about 20% less or at least about 30% less, as compared to conventional circuit installation methods.

EXAMPLES

Figure 8:
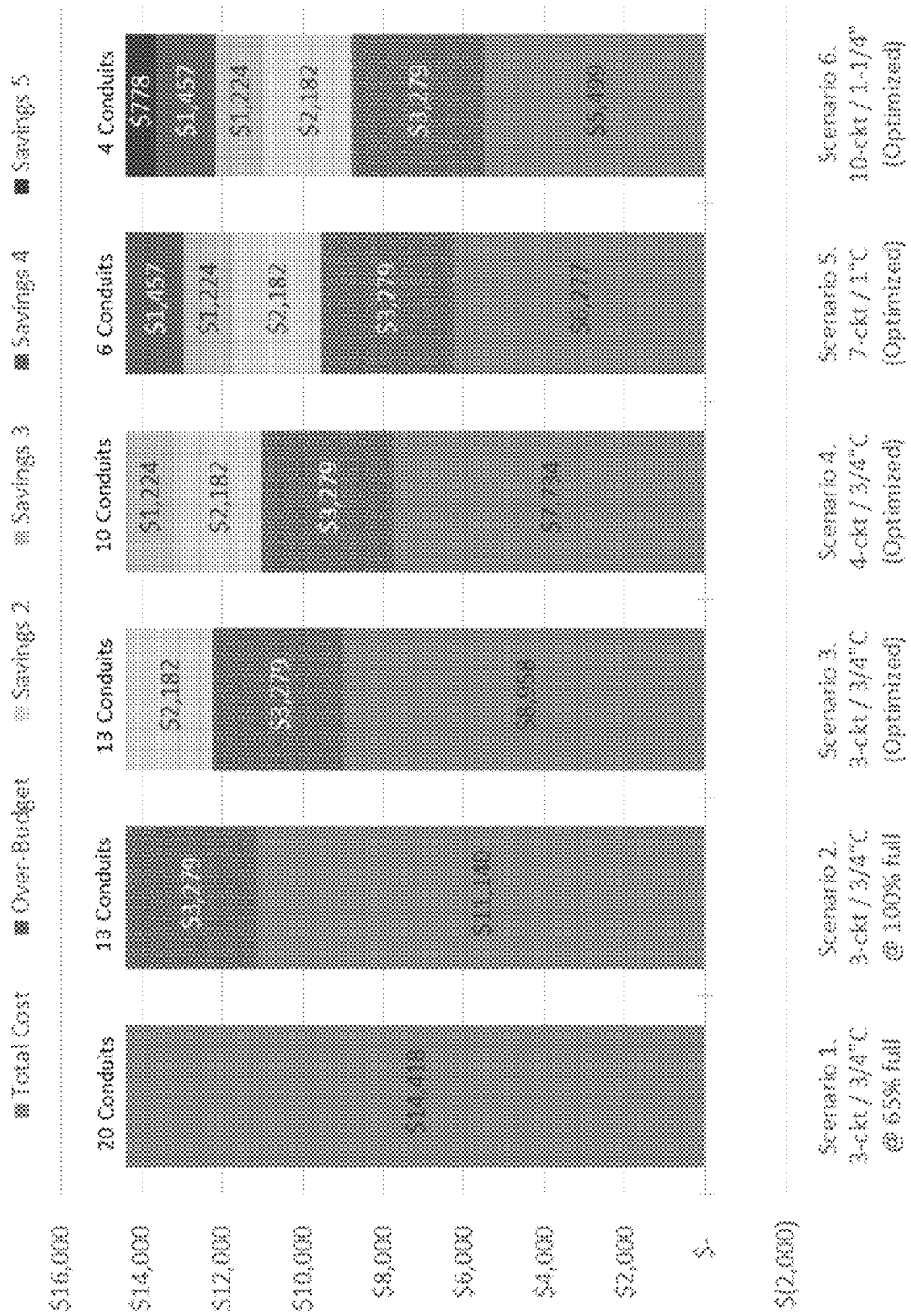
FIG. 8 shows a bar graph summarizing results from illustrative Examples 1-6, with respect to the amount of conduit required and the resulting costs associated with installation.

Constructive Examples are provided to illustrate certain advantages of the circuit grouping systems and methods, and circuit installation methods disclosed herein, in comparison to conventional branch circuit installations. Each example considers the installation of an electrical system comprising 39 branch circuits. Each of the 39 branch circuits are evenly grouped into one of 13 diagrammed circuit groups based on their proximity to each other in a circuit wiring diagram, as is commonly provided by an electrical engineer. The diagrammed circuits and circuit groups are summarized in Table I below, and based on the circuit wiring diagram partially shown in FIG. 2. The phase of each diagrammed circuit is determined according to a conventional electrical panel system, as shown in FIG. 1. Thus, diagrammed circuits 1-2, 7-8, 13-14, 19-20, 25-26, 31-32, and 37-38 are to be connected to the phase A feeder cable; diagrammed circuits 3-4, 9-10, 15-16, 21-22, 27-28, 33-34, and 39 are to be connected to the phase B feeder cable; and diagrammed circuits 5-6, 11-12, 17-18, 23-24, 29-30, and 35-36 are to be connected to the phase C feeder cable. Initially, EMT conduit (¾" diameter) having a maximum allowed capacity of four circuits is designated for each circuit housing run. In examples where a circuit grouping system is utilized, the circuit grouping system comprises 4 sets of 3 conductor pairs. Three of the sets comprise each conductor pair packaged as a group, in a barrel. The remaining set comprises individually packaged conductor pairs. Installation costs and relative savings over conventional methods for each example are summarized in FIG. 8.

TABLE I

Diagrammed circuits and Phase assignments for Examples 1-6.

| Initial circuit group | Diagrammed circuits | Phase A circuits | Phase B circuits | Phase C circuits |
|---|---|---|---|---|
| 1  | 1, 3, 5     | 1 | 1 | 1 |
| 2  | 2, 4, 6     | 1 | 1 | 1 |
| 3  | 7, 9, 18    | 1 | 1 | 1 |
| 4  | 8, 10, 13   | 2 | 1 | 0 |
| 5  | 11, 15, 17  | 0 | 1 | 2 |
| 6  | 12, 22, 24  | 0 | 1 | 2 |
| 7  | 14, 16, 20  | 2 | 1 | 0 |
| 8  | 19, 21, 23  | 1 | 1 | 1 |
| 9  | 25, 27, 28  | 1 | 2 | 0 |
| 10 | 26, 29, 30  | 1 | 0 | 2 |
| 11 | 31, 33, 35  | 1 | 1 | 1 |
| 12 | 32, 34, 36  | 1 | 1 | 1 |
| 13 | 37, 38, 39  | 2 | 1 | 0 |

Constructive Example 1 is representative of conventional methods, and thus provides a comparative example. Example 1 considers the installation of the branch circuits in groupings provided by the electrical engineer, and using a single conductor set comprising three conductor pairs, labeled as phase A, phase B, or phase C conductors. Circuits were grouped according to the proximity of their endpoints, and where possible, distributing the phase of the circuits evenly based on the circuit number. As can be seen in Table I, as more circuits were grouped, it was less common to include an even distribution of phases within the circuit grouping based while maintaining a grouping where the elements of the circuit are in relative proximity. Uneven combination of phase A, B, and C circuits, such as circuit 4, can result in a conduit run having two phase A conductor pairs and one phase B conductor pair. The phase A conductors will be indistinguishable once installed in the conduit run, and thus will either need to be labeled on-site, or installed in a separate conduit run as less than a full boat of conductors. Table II illustrates the scenario where additional conduit runs are installed to circumvent the redundant labeling, and thus requires the installation of 20 conduit runs, as opposed to the initially planned 13.

TABLE II

Installed circuit groupings according to conventional methods (Example 1).

| Installed circuit group | Diagrammed circuits | Phase A circuits | Phase B circuits | Phase C circuits |
|---|---|---|---|---|
| 1  | 1, 3, 5          | 1 | 1 | 1 |
| 2  | 2, 4, 6          | 1 | 1 | 1 |
| 3  | 7, 9, 18         | 1 | 1 | 1 |
| 4  | 8, 10            | 1 | 1 | 0 |
| 5  | 11, 15           | 0 | 1 | 1 |
| 6  | 12, 22           | 0 | 1 | 1 |
| 7  | 14, 16           | 1 | 1 | 0 |
| 8  | 19, 21, 23       | 1 | 1 | 1 |
| 9  | 25, 27           | 1 | 1 | 0 |
| 10 | 26, 29           | 1 | 0 | 1 |
| 11 | 31, 33, 35       | 1 | 1 | 1 |
| 12 | 32, 34, 36       | 1 | 1 | 1 |
| 13 | 37, 39           | 1 | 1 | 0 |
| 14 | 13 (from group 4)  | 1 | 0 | 0 |
| 15 | 17 (from group 5)  | 0 | 0 | 1 |
| 16 | 24 (from group 6)  | 0 | 0 | 1 |
| 17 | 20 (from group 7)  | 1 | 0 | 0 |
| 18 | 28 (from group 9)  | 0 | 1 | 0 |
| 19 | 30 (from group 10) | 0 | 0 | 1 |
| 20 | 38 (from group 13) | 1 | 0 | 0 |

Constructive Example 2

Branch circuits were installed using a circuit grouping system, according to the initial groupings provided by the engineer in Table I, based primarily on the proximity of elements in the electrical system, with secondary consideration to the phase of the circuits. In this example, there is no need for additional conduit as the labeling provided on the circuits with the same phase can be distinguished by installing conductor pairs from different sets (and having different set indicators). Thus, the initial groupings can be installed as intended, and listed in Table I, with multiple circuits of the same phase within a single circuit housing run and without requiring additional housing runs. In this example, the actual cost of installation equals that of the budgeted installation costs, and 38% less than installation costs in Example 1.

Constructive Example 3

Branch circuits were installed using a circuit grouping system, according to an optimized grouping conducted as described herein. The maximum allowed capacity of each circuit housing run was 3 circuits, as indicated by the engineer. Circuits provided in Table I were regrouped based primarily on their homerun endpoints, with secondary consideration given to the proximity of the elements in the electrical system associated with each circuit. Only groupings where each circuit in each group could be correlated to a component of the circuit grouping were considered. As for Example 2, only 13 conduits are needed to complete the installation, but optimizing the groupings based on the noted circuit data allows for material costs associated with installation to be reduced by 20% compared to the budgeted installation costs, and 38% compared to Example 1.

Constructive Example 4

Branch circuits were installed using a circuit grouping system, according to an optimized grouping conducted as described herein. The maximum allowed capacity of the circuit housing run was 4 circuits, based on the diameter of the ¾" EMT conduit indicated by the engineer. Again, circuits provided in Table I were regrouped into groups of 4 where possible, based primarily on their homerun endpoints, with secondary consideration given to the proximity of the elements in the electrical system associated with each circuit. Table III shows that by increasing the maximum group size to the maximum allowed capacity of the ¾" EMT conduit, the number of groupings can be reduced from 13 to 10, along with the amount of conduit housing runs required for installation. As a result, total costs of installation can be reduced by amount of conduit required can be reduced by 31%, compared to the budgeted installation cost, and reduced by 46% compared to Example 1.

TABLE III

Installed circuit groupings using a maximum allowed capacity of 4 circuits.

| Installed circuit group | Diagrammed circuits | Phase A circuits | Phase B circuits | Phase C circuits |
|---|---|---|---|---|
| 1 | 1, 3, 5, 31 | 2 | 1 | 1 |
| 2 | 2, 4, 6, 33 | 1 | 2 | 1 |
| 3 | 7, 9, 18, 35 | 1 | 1 | 2 |
| 4 | 8, 10, 17, 32 | 2 | 1 | 1 |
| 5 | 11, 15, 20, 34 | 1 | 2 | 1 |
| 6 | 12, 13, 22, 36 | 1 | 1 | 2 |
| 7 | 14, 16, 24, 37 | 2 | 1 | 1 |
| 8 | 19, 21, 23, 39 | 1 | 2 | 1 |
| 9 | 25, 27, 30, 38 | 2 | 1 | 1 |
| 10 | 26, 28, 29 | 1 | 1 | 1 |

Constructive Example 5

Branch circuits were grouped and installed as in Example 4, except that 1" diameter conduit was employed with a maximum allowed capacity of 7 circuits. Table IV shows that the increase in maximum group size allows the number of groupings to be reduced to 6. Total costs of installation are reduced by 44%, compared to the budgeted installation cost, and reduced by 56% compared to Example 1.

TABLE IV

Installed circuit groupings using a maximum allowed capacity of 7 circuits.

| Installed circuit group | Diagrammed circuits | Phase A circuits | Phase B circuits | Phase C circuits |
|---|---|---|---|---|
| 1 | 1, 3, 5, 31, 26, 28, 29 | 3 | 2 | 2 |
| 2 | 2, 4, 6, 33, 25, 27, 30 | 2 | 3 | 2 |
| 3 | 7, 9, 18, 35, 19, 21, 23 | 2 | 2 | 3 |
| 4 | 8, 10, 17, 32, 14, 16, 24 | 3 | 2 | 2 |
| 5 | 11, 15, 20, 34, 12, 13, 22 | 2 | 3 | 2 |
| 6 | 36, 37, 38, 39 | 2 | 1 | 1 |

Constructive Example 6

Branch circuits were grouped and installed as in Example 4, except that 1.25" diameter conduit was employed with a maximum allowed capacity of 10 circuits. Table V shows that the increase in maximum group size allows the number of groupings to be reduced to 4. Total costs of installation are reduced by 51%, compared to the budgeted installation cost, and reduced by 62% compared to Example 1.

TABLE V

Installed circuit groupings using a maximum allowed capacity of 10 circuits.

| Installed circuit group | Diagrammed circuits | Phase A circuits | Phase B circuits | Phase C circuits |
|---|---|---|---|---|
| 1 | 1, 3, 5, 31, 26, 28, 29, 11, 15, 20 | 4 | 3 | 3 |
| 2 | 2, 4, 6, 33, 25, 27, 30, 12, 13, 22, | 3 | 4 | 3 |
| 3 | 7, 9, 18, 19, 21, 23, 36, 37, 39 | 3 | 3 | 3 |
| 4 | 8, 10, 17, 32, 14, 16, 24, 34, 35, 38 | 4 | 3 | 3 |

We claim:

1. A circuit grouping system comprising a plurality of conductor sets, each conductor set comprising a plurality of conductors, wherein:
 each of the plurality of conductors comprises a conductor identification unique with respect to every other conductor in the circuit grouping system, the conductor identification comprising:
  a first coded identifier correlated to a function of the conductor, wherein the function of the conductor is either a load conductor or a neutral conductor;
  a second coded identifier comprising a chromatic phase indicator and an alphanumeric phase indicator, and wherein the second coded identifier is correlated to a phase of the conductor; and
  a third coded identifier comprising a chromatic set indicator and an alphanumeric set indicator, wherein the third coded identifier is correlated to a set of the conductor.

2. The circuit grouping system of claim 1, wherein the conductor identification comprises a printed label, a colored dye, an extruded stripe, a laser marking, a contact marking, a non-contact marking, or any combination thereof.

3. The circuit grouping system of claim 1, wherein at least one of the plurality of conductors comprises a THHN, XHHW, THWN, PV, USE-2 conductor, or any combination thereof.

4. The circuit grouping system of claim 1, wherein:
 the chromatic phase indicator corresponds to a phase color of a conventional electrical system color scheme;
 the chromatic set indicator is distinct from colors of the conventional electrical system color scheme; or
 both.

5. The circuit grouping system of claim 1, wherein the circuit grouping system comprises:
 three conductor sets consisting of three conductor pairs and an optional ground conductor, each of the conductor pairs and optional ground conductor packaged in a conductor barrel and configured to be pulled from the packaging as a group; and
 one conductor set consisting of three conductor pairs, each conductor pair packaged as a coiled reel and configured to be pulled from the packaging independently of the other conductor pairs in the conductor set.

6. A coded circuit wiring diagram comprising a circuit housing scheme, the circuit housing scheme comprising a plurality of coded circuit identifiers, wherein:
    each of the plurality of coded circuit identifiers correlates a diagrammed circuit in the circuit wiring diagram to a unique component of the circuit grouping system of claim 1; and
    each of the plurality of coded circuit identifier comprises:
        a circuit name that represents a diagrammed circuit of the circuit wiring diagram;
        a phase indicator that identifies the phase of the diagrammed circuit; and
        a set indicator that identifies the set of the diagrammed circuit.

7. The wiring diagram of claim 6, wherein:
    the circuit name is a number that correlates to a numbered terminal of an electrical panel;
    the phase indicator comprises a chromatic indicator color-coded to match a phase color of a conventional electrical system color scheme;
    the set indicator comprises a chromatic indicator having a color distinct from colors of the conventional electrical system color scheme;
    or any combination thereof.

8. A method for coding the coded circuit wiring diagram of claim 6, comprising:
    obtaining a conventional circuit wiring diagram comprising a plurality of diagrammed circuits;
    determining circuit data for each of the plurality of diagrammed circuits;
    assigning each of the diagrammed circuits to one of a plurality of diagrammed circuit groups;
    determining a coded circuit identifier for each diagrammed circuit in the diagrammed circuit group;
    generating a circuit housing scheme for each of the plurality of diagrammed circuit groups; and
    modifying the conventional circuit wiring diagram to incorporate each circuit housing scheme such that the coded circuit wiring diagram comprises each of the plurality of diagrammed circuits represented by its coded circuit identifier in a circuit housing scheme generated for the diagrammed circuit group to which the diagrammed circuit was assigned.

9. The method of claim 8, wherein assigning each of the diagrammed circuits comprises:
    selecting an electrical panel in the conventional circuit wiring diagram;
    dividing an amount of diagrammed circuits associated with the electrical panel by a maximum circuit housing capacity of a circuit housing to determine a number of diagrammed circuit groups;
    assigning diagrammed circuits to a diagrammed circuit group based on the proximity of endpoints of the diagrammed circuits, and independent from the phase of the circuit; and
    updating the identification data for each of the diagrammed circuit groups;
    wherein the amount of diagrammed circuits assigned to the diagrammed circuit group exceeds a target circuit housing fill percentage, but does not exceed the maximum circuit housing capacity.

10. The method of claim 8, further comprising generating a material order, the material order comprising:
    an amount of each unique component of the circuit grouping system, wherein the amount of any unique component is based on a sum the length of diagrammed circuits that have a coded circuit identifier that correlates to that unique component; and
    an amount of circuit housing, wherein the amount of circuit housing is based on a sum of the lengths of the longest diagrammed circuit in each diagrammed circuit group.

11. An on-demand method for supplying conductors to a job site for installation comprising:
    obtaining a conventional circuit wiring diagram comprising a plurality of diagrammed circuits;
    generating a coded circuit wiring diagram comprising a coded circuit identifier for each of the plurality of diagrammed circuits, wherein each coded circuit identifier correlates to a component of the circuit grouping system of claim 1;
    generating a material order comprising a calculated amount of each component of the circuit grouping system necessary to complete an installation;
    manufacturing the calculated amounts of each component of the circuit grouping system; and
    packaging the manufactured components of the circuit grouping system for delivery to the job site.

12. A circuit grouping system comprising:
    at least four conductor sets, each comprising a plurality of conductor pairs and an optional ground conductor; wherein:
    three of the conductor sets comprise conductor pairs packaged in a conductor barrel and configured to be pulled from the conductor barrel as a group;
    one of the plurality of conductor sets comprises a plurality of conductor pairs packaged in a coiled reel independent with respect to conductor pairs within the fourth conductor set; and
    each conductor within the circuit grouping system comprises a conductor identification having a unique combination of:
        a first coded identifier correlated to a function of the conductor;
        a second coded identifier correlated to a phase of the conductor; and
        a third coded identifier correlated to a set of the conductor.

13. The circuit grouping system of claim 12, wherein:
    the first coded identifier correlated to a neutral conductor is a white or light gray background tone; and
    the first coded identifier correlated to a load conductor is a background tone that is a color other than white or light gray.

14. The circuit grouping system of claim 12, wherein the second coded identifier correlated to a phase of the conductor is either of a background color or a text color corresponding to a phase color of a conventional 120/208/240V color scheme.

15. The circuit grouping system of claim 12, wherein the third coded identifier correlated to a set of the conductor comprises a colored stripe.

16. The circuit grouping system of claim 12, wherein each conductor set comprises three conductor pairs.

17. A coded circuit wiring diagram comprising a circuit housing scheme, the circuit housing scheme comprising a plurality of coded circuit identifiers, wherein:
    each of the plurality of coded circuit identifiers comprises:
        a circuit name that represents a diagrammed circuit of the circuit wiring diagram;
        a phase indicator that identifies the phase of the diagrammed circuit; and a set indicator that identifies the set of the diagrammed circuit; and each of the plurality of coded circuit identifiers correlates a diagrammed circuit in the coded circuit wiring diagram to a unique component of the circuit grouping system of claim 12.

18. The wiring diagram of claim 17, wherein:
the circuit name is a number that correlates to a numbered terminal of an electrical panel;
the phase indicator comprises a chromatic indicator color-coded to match a phase color of a conventional electrical system color scheme;
the set indicator comprises a chromatic indicator having a color distinct from colors of the conventional electrical system color scheme;
or any combination thereof.

19. A method for coding the coded circuit wiring diagram of claim 17, comprising:
obtaining a conventional circuit wiring diagram comprising a plurality of diagrammed circuits;
determining a set of circuit data for each of the plurality of diagrammed circuits;
assigning each of the plurality of diagrammed circuits to one of a plurality of diagrammed circuit groups;
determining a coded circuit identifier for each diagrammed circuit in the diagrammed circuit group;
generating a circuit housing scheme for each of the plurality of diagrammed circuit groups; and modifying the conventional circuit wiring diagram to incorporate each circuit housing scheme such that the coded circuit wiring diagram comprises each of the plurality of diagrammed circuits represented by its coded circuit identifier in a circuit housing scheme generated for the diagrammed circuit group to which the diagrammed circuit was assigned.

20. The method of claim 19, wherein assigning each of the diagrammed circuits comprises:
selecting an electrical panel in the conventional circuit wiring diagram;
dividing an amount of diagrammed circuits associated with the electrical panel by a maximum circuit housing capacity of a circuit housing to determine a number of diagrammed circuit groups;
assigning diagrammed circuits to a diagrammed circuit group based on the proximity of endpoints of the diagrammed circuits, and independent from the phase of the circuit; and
updating the identification data for each of the diagrammed circuit groups;
wherein the amount of diagrammed circuits assigned to the diagrammed circuit group exceeds a target circuit housing fill percentage, but does not exceed the maximum circuit housing capacity.

* * * * *